US012808656B2

(12) United States Patent
Jeng et al.

(10) Patent No.: US 12,808,656 B2
(45) Date of Patent: Nov. 24, 2026

(54) STANDARD TEST METHOD FOR VALIDATING THE ACCURACY OF MOBILE PHONE APPS IN MEASURING CONCRETE CRACK WIDTHS

(71) Applicant: NATIONAL CHI NAN UNIVERSITY, Puli Township (TW)

(72) Inventors: Chyuan-Hwan Jeng, Puli Township (TW); Min Chao, Puli Township (TW)

(73) Assignee: NATIONAL CHI NAN UNIVERSITY, Puli Township (TW)

( * ) Notice: Subject to any disclaimer, the term of this patent is extended or adjusted under 35 U.S.C. 154(b) by 69 days.

(21) Appl. No.: 19/072,810

(22) Filed: Mar. 6, 2025

(65) Prior Publication Data

US 2026/0168784 A1 Jun. 18, 2026

(30) Foreign Application Priority Data

Dec. 18, 2024 (TW) ................................ 113149405

(51) Int. Cl.
*G01B 11/02* (2006.01)
*G06T 7/60* (2017.01)
*H04N 23/63* (2023.01)

(52) U.S. Cl.
CPC .............. *G01B 11/022* (2013.01); *G06T 7/60* (2013.01); *H04N 23/632* (2023.01)

(58) Field of Classification Search
CPC ....... G01B 11/022; G01B 11/026; G06T 7/60; G06T 7/0004; H04N 23/632
See application file for complete search history.

(56) References Cited

FOREIGN PATENT DOCUMENTS

JP 2011124965 A * 6/2011

* cited by examiner

*Primary Examiner* — Monica T Taba
(74) *Attorney, Agent, or Firm* — J.C. PATENTS

(57) ABSTRACT

This invention discloses a standard test method and an associated standard apparatus for evaluating the accuracy of mobile phone apps designed to measure concrete crack widths. The said standard apparatus comprises at least a standardized crack-width calibration plate (CWCP), a simulated wall (SW), a pose adjusting and fixing device (PAFD), and a spatial distance measuring assemblage (SDMA). The standard test method employs an innovative two-stage method associated with the SDMA to synchronously calculate and display the average distances ($K_i$, where i=1 to 4) from the four corner points of a mobile phone to the SW. With continuous feedback, the phone's spatial position can be adjusted using the PAFD until the four monitored $K_i$ values match the target $K_i$. Subsequently, an app installed on the phone is used to measure crack widths on the CWCP. In the standard test method of the present invention, a standard experimental procedure is also established for conducting standard tests to assess the accuracy of mobile phone apps in measuring concrete crack widths.

10 Claims, 19 Drawing Sheets

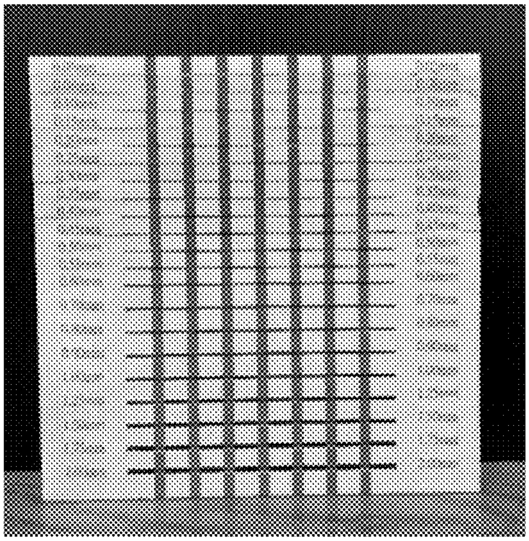
FIG. 4c
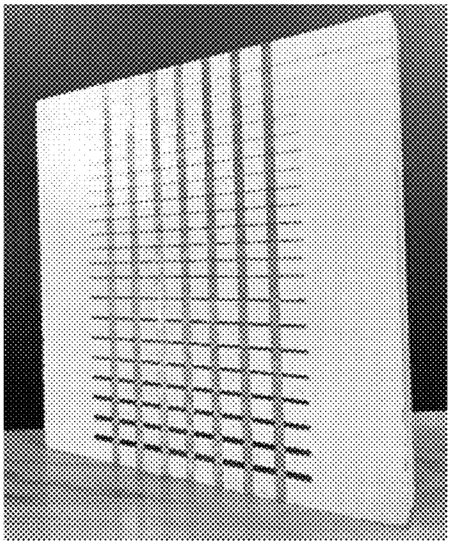
FIG. 4d
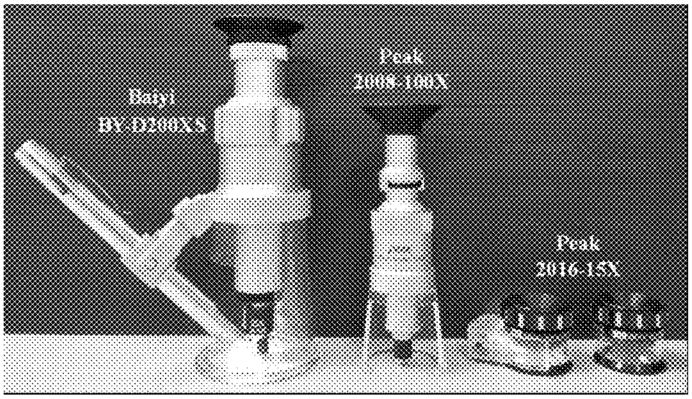
FIG. 4e
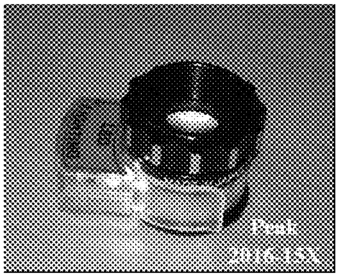
FIG. 4f
| Brand & Model | Magnification | Smallest Scale (mm) | Maximum Measurement Value (mm) | Precision of Estimated Digit (mm) | Country of Manufacture |
|---|---|---|---|---|---|
| Baiyi BY-D200XS | 200x | 0.002 | 0.6 | 0.001 | Taiwan |
| Peak 2008-100X | 100x | 0.005 | 0.8 | 0.0025 | Japan |
| Peak 2016-15X | 15x | 0.1 | 14 | 0.05 | Japan |
FIG. 4g

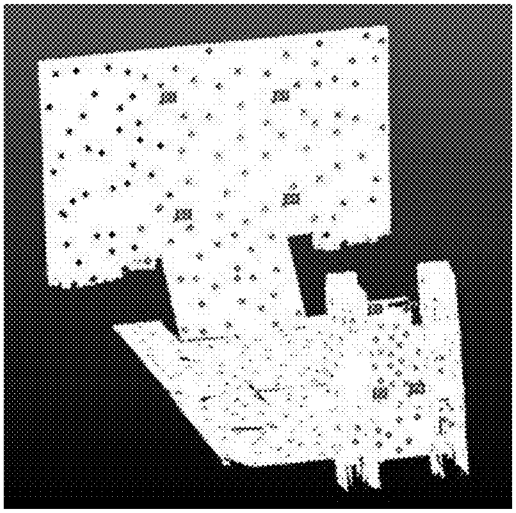

FIG. 9d

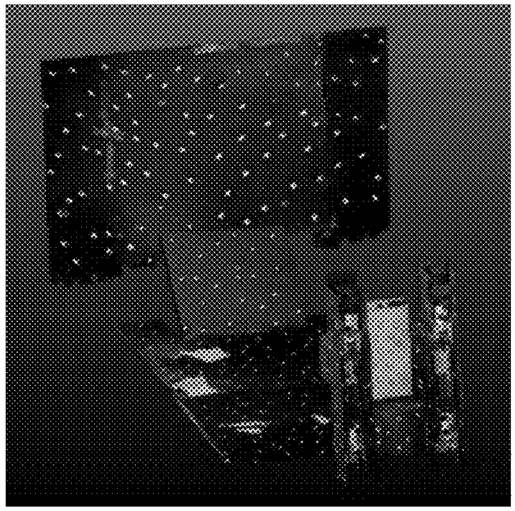

FIG. 9e

1. The SDMA, mounted on top of the PAFD, direct laser beams from the four LDSs toward an arbitrary wall panel, not the test wall, as illustrated in FIGS. 9a to 9c.
2. A 3D scanner is used to scan the entire SDMA and wall panel (FIG. 9c), generating a 3D point cloud of the device and wall (FIGS. 9d and 9e).
3. The 3D coordinates of points $P_1$ to $P_4$ (mobile phone corners), $S_1$ to $S_4$ (laser-emitting points of the LDSs), and $E_1$ to $E_4$ (laser terminal points on the wall panel) are extracted from the point cloud.
4. The 3D unit vectors, $\hat{\mathbf{u}}_1$ to $\hat{\mathbf{u}}_4$, are calculated using the coordinates of $S_1$–$S_4$ and $E_1$–$E_4$. These vectors point from the laser-emitting points ($S_1$–$S_4$) toward their terminal points on the wall panel ($E_1$–$E_4$).
5. Thus, the spatial relationship between the LDSs' laser beams ($S_1$–$S_4$ and $\hat{\mathbf{u}}_1 - \hat{\mathbf{u}}_4$) and the mobile phone ($P_1$–$P_4$) within the SDMA is obtained.

FIG. 10

1. The SDMA and the PAFD are repositioned to face the test wall (FIGS. 11a to 11b), while maintaining the relative spatial positions of the mobile phone and the four LDSs within the SDMA (as in Stage 1).
2. Consequently, the previously determined 3D coordinates of the phone's corners ($P_1$–$P_4$), laser-emitting points ($S_1$–$S_4$), and laser direction unit vectors ($\hat{\mathbf{u}}_1 - \hat{\mathbf{u}}_4$) remain unchanged.
3. Using real-time distance measurements ($d_1$ to $d_4$) from the four LDSs, along with the coordinates of $S_1$–$S_4$ and unit vectors $\hat{\mathbf{u}}_1 - \hat{\mathbf{u}}_4$, the 3D coordinates of laser terminal points $W_1$ to $W_4$ on the test wall are determined (FIG.11a).
4. The equations of four spatial planes $N_1$ to $N_4$, each representing the test wall, are determined using the 3D coordinates of $W_1$ to $W_4$. Consequently, the distances $Q_{ij}$ from the phone's corner points $P_i$ ($P_{ix}$, $P_{iy}$, $P_{iz}$) perpendicular to the planes $N_j$ (equation $a_j x + b_j y + c_j z + d_j = 0$) can be calculated:

$$Q_{ij} = \frac{\left|a_j P_{ix} + b_j P_{iy} + c_j P_{iz} + d_j\right|}{\sqrt{a_j^2 + b_j^2 + c_j^2}}, \quad \text{for } i, j = 1, 2, 3, 4$$

5. The 16 distances $Q_{ij}$ are averaged to determine the average distances $K_1$ to $K_4$ from the phone's corners $P_1$ to $P_4$ to the test wall (FIG.11a):

$$K_i = \frac{Q_{i1} + Q_{i2} + Q_{i3} + Q_{i4}}{4}$$

FIG. 12

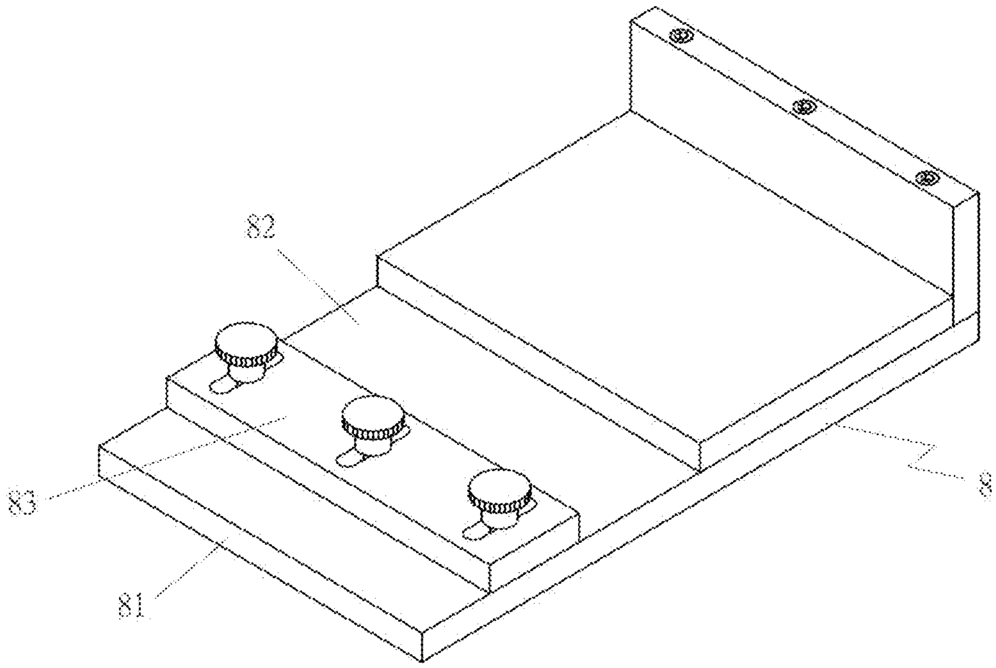

FIG. 13

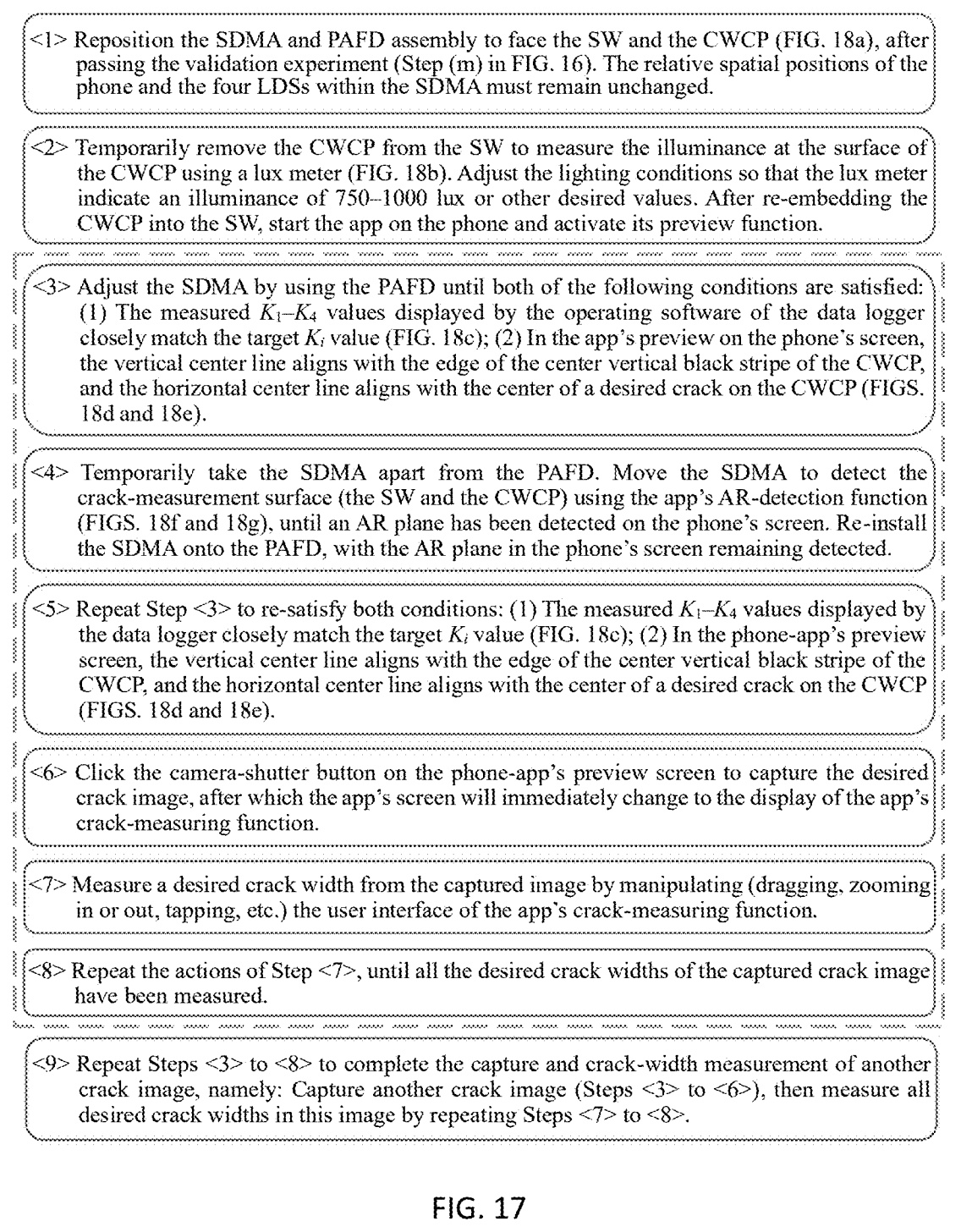

<1> Reposition the SDMA and PAFD assembly to face the SW and the CWCP (FIG. 18a), after passing the validation experiment (Step (m) in FIG. 16). The relative spatial positions of the phone and the four LDSs within the SDMA must remain unchanged.

<2> Temporarily remove the CWCP from the SW to measure the illuminance at the surface of the CWCP using a lux meter (FIG. 18b). Adjust the lighting conditions so that the lux meter indicate an illuminance of 750–1000 lux or other desired values. After re-embedding the CWCP into the SW, start the app on the phone and activate its preview function.

<3> Adjust the SDMA by using the PAFD until both of the following conditions are satisfied: (1) The measured $K_1$–$K_4$ values displayed by the operating software of the data logger closely match the target $K_i$ value (FIG. 18c); (2) In the app's preview on the phone's screen, the vertical center line aligns with the edge of the center vertical black stripe of the CWCP, and the horizontal center line aligns with the center of a desired crack on the CWCP (FIGS. 18d and 18e).

<4> Temporarily take the SDMA apart from the PAFD. Move the SDMA to detect the crack-measurement surface (the SW and the CWCP) using the app's AR-detection function (FIGS. 18f and 18g), until an AR plane has been detected on the phone's screen. Re-install the SDMA onto the PAFD, with the AR plane in the phone's screen remaining detected.

<5> Repeat Step <3> to re-satisfy both conditions: (1) The measured $K_1$–$K_4$ values displayed by the data logger closely match the target $K_i$ value (FIG. 18c); (2) In the phone-app's preview screen, the vertical center line aligns with the edge of the center vertical black stripe of the CWCP, and the horizontal center line aligns with the center of a desired crack on the CWCP (FIGS. 18d and 18e).

<6> Click the camera-shutter button on the phone-app's preview screen to capture the desired crack image, after which the app's screen will immediately change to the display of the app's crack-measuring function.

<7> Measure a desired crack width from the captured image by manipulating (dragging, zooming in or out, tapping, etc.) the user interface of the app's crack-measuring function.

<8> Repeat the actions of Step <7>, until all the desired crack widths of the captured crack image have been measured.

<9> Repeat Steps <3> to <8> to complete the capture and crack-width measurement of another crack image, namely: Capture another crack image (Steps <3> to <6>), then measure all desired crack widths in this image by repeating Steps <7> to <8>.

FIG. 17

STANDARD TEST METHOD FOR VALIDATING THE ACCURACY OF MOBILE PHONE APPS IN MEASURING CONCRETE CRACK WIDTHS

CROSS-REFERENCE TO RELATED APPLICATION

This application claims the priority benefit of Taiwan application serial no. 113149405, filed on Dec. 18, 2024. The entirety of the above-mentioned patent application is hereby incorporated by reference herein and made a part of this specification.

BACKGROUND OF THE INVENTION

1. Field of the Invention

The present invention relates to methods and apparatus for evaluating the accuracy of mobile phone apps in measuring concrete crack widths. More particularly, it focuses on a standardized test method and associated apparatus for such evaluations.

2. Description of the Prior Art

Traditional methods for measuring concrete crack widths require a trained worker to press a measuring gadget against the concrete surface and visually read the scale with the naked eye. Over the past decade, the capability-to-price ratio of mobile phones has continually increased. Smartphones equipped with digital cameras have recently become the norm, featuring significant improvements in both mobile computing capabilities and camera performance. Consequently, a smartphone app now has the potential to transform a phone into a convenient tool for measuring concrete cracks, offering an alternative to the relatively cumbersome traditional methods.

While the functionalities of mobile app software and hardware have greatly improved, many general-purpose apps for queries, entertainment, and other uses only offer visual precision adequate for the human eye. In contrast, a crack-measuring app must provide sufficient accuracy and precision for engineering applications. Therefore, verifying and confirming the accuracy of crack measurements made using a mobile phone app is key. To address this issue, the present invention discloses a standard test method and an associated standard apparatus for systematically evaluating the accuracy of mobile phone apps in measuring concrete crack widths.

When using a mobile phone app to measure concrete cracks, the app first captures a color digital image of the crack surface using the phone's camera and then applies a digital image analysis process to extract a monochrome (black-and-white) crack image from the original color image. The app then determines the required crack-width values based on this monochrome image.

Applications of Digital Image Processing Techniques:

To extract characteristic and representative monochrome crack images for detecting and/or measuring concrete surface cracks, numerous prior studies in the literature have employed digital image processing techniques. For example, over the past two decades, Abdel-Qader et al. [2003] compared the effectiveness of four edge-detection algorithms (Fast Haar Transform, Fast Fourier Transform, Sobel, and Canny) for identifying cracks in concrete bridge deck images. Hutchinson and Chen [2006] proposed an automated statistical procedure to find optimal parameter sets for the two more reliable algorithms (Canny and Fast Haar Transform) found in Abdel-Qader et al.'s work. Yamaguchi and Hashimoto [2009, 2010] introduced a percolation-based image processing method for crack detection and proposed using a crack scale attached to the concrete surface during image acquisition, enabling crack-width measurement with sub-pixel accuracy. Zhu et al. [2011] adopted and slightly modified Yamaguchi and Hashimoto's percolation-based crack detection method. In addition, they applied an image-thinning algorithm to extract cracks' (center) skeletons and used a Euclidean distance transform to calculate a distance field containing each crack pixel's nearest distance to its boundaries, thus allowing for retrieval of cracks' properties including crack length, orientation, maximum width, and average width.

The digital image correlation (DIC) method has also been commonly applied to measure concrete cracks. For example, Choi and Shah [1997], Destrebecq et al. [2010], Dutton [2012], Zhao et al. [2018], and Bertelsen et al. [2019] employed DIC for this purpose. Lawler et al. [2001] combined two-dimensional DIC with three-dimensional X-ray microtomography to measure the deformation and crack development in concrete cubes under uniaxial compression.

In more recent advancements, Nguyen et al. [2014] utilized the symmetric and line-like characteristics of concrete cracks to remove non-crack noise. They extracted crack skeletons from the filtered images using thresholding and morphological thinning, and refined the skeleton connections with cubic splines. The crack edges were determined from crack pixels perpendicular to the spline curves. Yang et al. [2015] captured crack images with two cameras (a stereo vision approach) and analyzed minute relative displacements on either side of the cracks, achieving a measurement accuracy of 0.2 pixels. This approach contributed to the advancement of related studies and damage assessment applications [Yang et al. 2018; Woods et al. 2021]. Rivera et al. [2015] employed the Prewitt edge-detection algorithm and morphological operations in MATLAB to detect cracks and surface defects. They segmented cracks from surface defects based on two criteria: orientation angle and major-to-minor axes length ratio, and calculated crack widths using MATLAB's built-in regionprops function.

Recent years have also seen a surge in studies employing machine learning and deep learning methods for crack detection. In an early study, Cha et al. [2017] used a dataset of 40,000 small images (256×256 pixels each) to train a convolutional neural network (CNN) for crack identification with 98% accuracy. The trained CNN was tested on 55 large images (5,888×3,584 pixels) of other structures using a scanning window, demonstrating a better crack-detection performance compared to the Canny and Sobel edge-detection algorithms. To address the time-consuming process of scanning-window approaches and localize crack regions for subsequent crack segmentation, later studies employed region-based (bounding-box) methods such as a region proposal network in Faster R-CNN [Cha et al. 2018; Kang et al. 2020], the crack candidate region method [Kim et al. 2019; Kim et al. 2022], and the YOLO-based methods [Yu et al. 2021; Choi et al. 2024]. Mask R-CNN further extended Faster R-CNN by adding a branch for predicting segmentation masks [Choi et al. 2024; He et al. 2017].

However, these machine learning and deep learning methods primarily addressed crack detection and segmentation. The quantification of crack length, orientation, and width still relied on earlier digital image processing methods, such as image thinning and distance transform procedures. In a study focused on automatic crack-width measurement, Carrasco et al. [2021] applied k-means clustering to determine the center points of crack skeletons and classify the pixels across a crack-width profile into two groups: crack or background.

Studies Related to the Application of Mobile Phone Apps:

Studies on the application of mobile phone apps for concrete crack detection or measurement are relatively scarce in the literature [e.g., Chen et al. 2015; Kong et al. 2017; Ni et al. 2020, 2021; Gepiga et al. 2022; Wang et al. 2024] Chen et al. [2015] developed an Android app capable of capturing crack images and determining the maximum crack width from the captured images. When measuring a crack surface with this app, a shim block was placed between the phone and the surface to maintain the phone parallel to and at a fixed distance of 10 cm from the crack surface, as the calibration coefficient used for the phone was based on this distance.

Kong et al. [2017] proposed a system for detecting the type and size of road cracks. The system's data capture module enabled smartphones to take crack photos and record readings from the phone's accelerometer, magnetometer, and GPS. The crack size estimation module then used the captured photos and sensor readings to estimate crack length and width. This system detected road cracks with widths ranging from 6 cm to 25 cm, which was unsuitable for detecting finer cracks in concrete structures or components.

By conducting experiments on seven smartphone models from four different brands, Ni et al. [2020, 2021] found that, for a fixed distance between the phone's camera and the target, the size of a single pixel (n') in the captured images decreased exponentially as the zoom ratio increased from 1 to 10. They quantified these exponential functions for $\eta'$ at a shooting distance of 1 m. Overall, their results showed that $\eta'$ decreased from approximately 0.37 mm to 0.03 mm as the zoom ratio increased.

Gepiga et al. [2022] proposed an automated crack detection and measurement system using smartphones to capture crack images. The phone app also recorded the object-to-camera distance using Google's ARCore library, and the phone's alignment was guided with gyroscope measurements to approximate a 90° angle to the surface. The captured images, along with the recorded distances, were processed on a laptop using Musk R-CNN for image segmentation and Carrasco et al.'s [Carrasco et al. 2021] method for crack quantification.

Wang et al. [2024] developed a specialized handheld image acquisition device for collecting crack video images, which were wirelessly transmitted to a smartphone. An app on the phone performed crack detection and crack-width measurement based on the transmitted video images.

Of the abovementioned studies, the measured crack-width values ranged from approximately 0.3 mm-1.0 mm [Chen et al. 2015], 0.6 mm-1.2 mm [Ni et al. 2020, 2021], 0.2 mm-2.2 mm [Gepiga et al. 2022], and 0.17 mm-2.9 mm [Wang et al. 2024]. The smallest value (0.17 mm) was still insufficient to replace traditional crack-width gauges in engineering practice. Traditional gauges, such as crack measuring magnifiers and crack-width comparator cards, can measure crack widths as thin as 0.05 mm or at least 0.1 mm to meet practical engineering and structural concrete requirements.

Verifying the accuracy and precision of crack-width measurement is another issue. In the studies mentioned above, the crack-width values obtained using the phone apps or laptop processing were compared with manual measurements performed with a measuring magnifier or an electronic instrument. However, these comparisons were based on limited sample sizes.

Various electronic crack-width measuring instruments are commercially available and generally fall into two main categories. The first category includes advanced versions of traditional crack measuring magnifiers or microscopes, where optical lenses are replaced with high-definition digital cameras. The second category [e.g., Tokyo Electron Device 2021] utilized digital image processing techniques to generate crack-width measurements. However, the specifications provided by manufacturers should only reflect the instruments' electronic or mechanical performance indices, not statistically significant accuracy indices. This is because no standardized test procedures exist in the literature. The standard test apparatus and method disclosed in the present invention aim to address this issue and could help develop a phone app capable of measuring crack widths as thin as 0.05 mm or 0.1 mm.

LIST OF THE CITED REFERENCES

Abdel-Qader I, Abudayyeh O, Kelly M E [2003]. Analysis of edge-detection techniques for crack identification in bridges. Journal of Computing in Civil Engineering, ASCE; 17 (4): 255-263.

Bertelsen I M G, Kragh C, Cardinaud G, Ottosen L M, Fischer G [2019]. Quantification of plastic shrinkage cracking in mortars using digital image correlation. Cement and Concrete Research; 123:105761. https://doi.org/10.1016/j.cemconres.2019.05.006

Bureau of Standards, Metrology and Inspection. Taiwan national standards: CNS 12112-Recommended levels of illumination. Ministry of Economic Affairs, Taiwan; January 2012.

Carrasco M, Araya-Letelier G, Velázquez R, Visconti P [2021]. Image-based automated width measurement of surface cracking. Sensors; 21 (22): 7534. https://doi.org/10.3390/s21227534

Cha Y J, Choi W, Büyüköztürk O [2017]. Deep learning-based crack damage detection using convolutional neural networks. Computer-aided Civil and Infrastructure Engineering; 32 (5): 361-378. https://doi.org/10.1111/mice.12263

Cha Y J, Choi W, Suh G, Mahmoudkhani S, Büyüköztürk O [2018]. Autonomous structural visual inspection using region-based deep learning for detecting multiple damage types. Computer-aided Civil and Infrastructure Engineering; 33 (9): 731-747. https://doi.org/10.1111/mice.12334

Chen S, Shi Z, Yan Q [2015]. Concrete crack width detecting system for Android platform. The Open Civil Engineering Journal; 9:846-851. https://doi.org/10.2174/1874149501509010846

Choi S, Shah S P [1997]. Measurement of deformations on concrete subjected to compression using image correlation. Experimental Mechanics; 37 (3): 307-313.

Choi Y, Bae B, Han T H, Ahn J [2024]. Application of Mask R-CNN and YOLOv8 algorithms for concrete crack detection, IEEE Access; https://doi.org/10.1109/ACCESS.2024.3469951

Chun P J, Izumi S, Yamane T [2021]. Automatic detection method of cracks from concrete surface imagery using two-step light gradient boosting machine. Computer-aided Civil and Infrastructure Engineering; 36 (1): 61-72. https://doi.org/10.1111/mice.12564

Destrebecq J F, Toussaint E, Ferrier E [2010]. Analysis of cracks and deformations in a full scale reinforced concrete beam using a digital image correlation technique. Experimental Mechanics; 51 (6): 879-890.

Dung C V, Anh L D [2019]. Autonomous concrete crack detection using deep fully convolutional neural network. Automation in Construction; 99:52-58. https://doi.org/10.1016/j.autcon.2018.11.028

Dutton M [2012]. Digital image correlation for evaluating structural engineering materials. Master's thesis, Dept. of Civil Engineering, Queen's University, Kingston, Ontario, Canada, 113 pp; September.

Gepiga C S, Magana J P, Sandoval G A D, and Angelia R E [2022]. Automated crack detection and measurement based on Mask R-CNN and image analysis with mobile application. 5th International Conference on Electronics and Electrical Engineering Technology (EEET); Beijing, China: 14-22. https://doi.org/10.1109/EEET58130.2022.00011

Gonzalez R C, Woods R E, [2018]. Digital image processing. 4th ed. Essex, England: Pearson Education Limited.

He K, Gkioxari G, Dollár P, Girshick R. Mask R-CNN [2017]. 2017 IEEE International Conference on Computer Vision (ICCV), Venice, Italy: 2980-2988. https://doi.org/10.1109/ICCV.2017.322

Hutchinson T C, Chen Z [2006]. Improved image analysis for evaluating concrete damage. Journal of Computing in Civil Engineering, ASCE; 20 (3): 210-216.

Kang D, Benipal S S, Gopal D L, Cha Y J [2020]. Hybrid pixel-level concrete crack segmentation and quantification across complex backgrounds using deep learning. Automation in Construction; 118:103291. https://doi.org/10.1016/j.autcon.2020.103291

Kim H, Ahn E, Shin M, Sim S H [2019]. Crack and noncrack classification from concrete surface images using machine learning. Structural Health Monitoring; 18 (3): 725-738. https://doi.org/10.1177/1475921718768747

Kim H, Sim S H, Spencer B F [2022]. Automated concrete crack evaluation using stereo vision with two different focal lengths, Automation in Construction; 135:104136. https://doi.org/10.1016/j.autcon.2022.104136

Kong Y, Yu Z, Chen H, Wang Z, Chen C, Guo B [2017]. Detecting type and size of road crack with the smartphone. 2017 IEEE International Conference on Computational Science and Engineering (CSE) and IEEE International Conference on Embedded and Ubiquitous Computing (EUC); 1:572-529. https://doi.org/10.1109/CSE-EUC.2017.106

Lawler J S, Keane D T, Shah S P [2001]. Measuring three-dimension damage in concrete under compression. ACI Materials Journal; 98 (6): 465-475.

Nguyen H N, Kam T Y, Cheng P Y [2014]. An automatic approach for accurate edge detection of concrete crack utilizing 2D geometric features of crack. Journal of Signal Processing Systems; 77 (3): 221-240.

Ni T, Zhou R, Gu C, Yang Y [2020]. Measurement of concrete crack feature with Android smartphone app based on digital image processing techniques. Measurement; 150:107093. https://doi.org/10.1016/j.measurement.2019.107093

Ni T, Zhou R, Yang Y, Yang X, Zhang W, and Lin C [2021]. Research on detection of concrete surface cracks by image processing based on smartphone app (in Chinese). Acta Metrologica Sinica; 42, 2:163-170. https://doi.org/10.3969/j.issn.1000-1158.2021.02.06

Rezaie A, Achanta R, Godio M, Beyer K [2020]. Comparison of crack segmentation using digital correlation measurements and deep learning. Construction and Building Materials; 261:120474. https://doi.org/10.1016/j.conbuildmat.2020.120474

Rivera J P, Josipovic G, Lejeune E, Luna B N, Whittaker A S [2015]. Automated detection and measurement of cracks in reinforced concrete components. ACI Structural Journal; 112 (3): 397-405.

Tokyo Electron Device [2021]. Launch of sales of "Tablet-type crack width measuring instrument FCV-40 CRACK VIEWER," (in Japanese), December 20: https://www-.teldevice.co.jp/pro_info/2021/press_211220.php (accessed 26 Feb. 2025)

Wang H, Peng H, Tang Y, Guan Y, Liang Y, Wang L, Zhao Y, Wang X, Gao R, Huang H [2024]. Portable structure surface crack detection system based on Android platform. Wuhan University Journal of Natural Sciences; 29 (2): 154-164. https://doi.org/10.1051/wujns/2024292154

Woods J E, Yang Y S, Chen P C, Lau D T [2021]. Automated crack detection and damage index calculation for RC structures using image analysis and fractal dimension. Journal of Structural Engineering, ASCE; 147 (4). https://doi.org/10.1061/(ASCE) ST.1943-541X.0002970

Yamaguchi T, Hashimoto S [2010]. Fast crack detection method for large-size concrete surface images using percolation-based image processing. Machine Vision and Applications; 21(5): 797-809.

Yamaguchi T, Hashimoto S [2009]. Practical image measurement of crack width for real concrete structure. Electronics and Communications in Japan; 92 (10): 1-12.

Yang Y S, Wu C L, Hsu T T C, Yang H C, Lu H J, Chang C C [2018]. Image analysis method for crack distribution and width estimation for reinforced concrete structures. Automation in Construction; 91:120-132. https://doi.org/10.1016/j.autcon.2018.03.012

Yang Y S, Yang C M, Huang C W [2015]. Thin crack observation in a reinforced concrete bridge pier test using image processing and analysis. Advances in Engineering Software; 83:99-108.

Yu Z, Shen Y, Shen C [2021]. A real-time detection approach for bridge cracks based on YOLOv4-FPM. Automation in Construction; 122:103514. https://doi.org/10.1016/j.autcon.2020.103514

Zhao P, Zsaki A M, Nokken M R [2018]. Using digital image correlation to evaluate plastic shrinkage cracking in cement-based materials. Construction and Building Materials; 182:108-117. https://doi.org/10.1016/j.conbuildmat.2018.05.239

Zhu Z, German S, Brilakis I [2011]. Visual retrieval of concrete crack properties for automated post-earthquake structural safety evaluation. Automation in Construction; 20 (7): 874-883. https://doi.org/10.1016/j.autcon.2011.03.004

SUMMARY OF THE INVENTION

This invention discloses a standard test method and an associated standard apparatus for evaluating the accuracy of mobile phone apps in measuring concrete crack widths. The standard apparatus includes at least a standardized crack-width calibration plate (CWCP), a simulated wall (SW), a pose adjusting and fixing device (PAFD), and a spatial distance measuring assemblage (SDMA). The disclosed standard test method employs an innovative two-stage process to synchronously calculate and display the spatial position of the mobile phone relative to the SW. With continuous feedback, the phone's position can be adjusted using the PAFD until the desired spatial position is reached.

Subsequently, an app installed on the phone is used to measure crack widths on the CWCP.

In one embodiment of the standard test method, a standard experimental procedure was established to conduct standard tests assessing the accuracy of a preliminary Android app in measuring concrete crack widths. The experimental results of these standard tests demonstrate the effectiveness of the proposed test method.

The standard test method and the associated standard apparatus, grounded in their underlying physical meaning, can realistically simulate actual engineering conditions (e.g., the spatial position of the mobile phone relative to the test wall, lighting conditions, mobile phone camera performance, app measurement methods, temperature, humidity, etc.) precisely and cost-effectively.

The disclosed standard test method can control experimental parameters and reproduce required test conditions for repeated experiments. This allows for investigating the effects of various parameters, comparing results under identical conditions, and establishing the reliability of app accuracy validation through repeated, systematic experiments.

BRIEF DESCRIPTION OF DRAWINGS

This invention will be better understood by referring to the accompanying drawings, wherein:

FIG. 4*c* is a first photographic view of the second embodiment of the crack-width calibration plate (CWCP);

FIG. 4*d* is a second photographic view of the second embodiment of the crack-width calibration plate (CWCP);

FIG. 4*e* is a first photographic view showing four traditional crack-width measuring instruments measuring simulated cracks on the crack-width calibration plate (CWCP);

FIG. 4*f* is a second photographic view showing a traditional crack-width measuring instrument measuring simulated cracks on the crack-width calibration plate (CWCP);

FIG. 4*g* is a table presenting specifications of the traditional crack-width measuring instruments used to measure simulated cracks on the crack-width calibration plate (CWCP);

FIG. 9*d* is an image showing the 3D point cloud generated during Stage 1 of the two-stage method;

FIG. 9*e* is an image showing the 3D texture generated by combining the point cloud data with camera images during Stage 1 of the two-stage method;

FIG. 10 lists the procedural steps of Stage 1 in the two-stage method;

FIG. 12 lists the procedural steps of Stage 2 in the two-stage method;

FIG. 13 is a schematic diagram showing an embodiment of the zero-calibration caliper (ZCC);

FIG. 17 is a flow chart illustrating the procedural steps in an embodiment of the standard phone app crack-width measurements within the standard experimental procedure;

DETAILED DESCRIPTION OF THE PREFERRED EMBODIMENT

This invention discloses a standard test method and an associated standard apparatus for evaluating the accuracy of mobile phone apps in measuring concrete crack widths. As illustrated in FIGS. 1*a*, 4*b*, 5*a*, 7*a*, and 8*a*, the said standard apparatus includes at least a simulated wall (SW) 1, a crack-width calibration plate (CWCP) 2, a pose adjusting and fixing device (PAFD) 3, and a spatial distance measuring assemblage (SDMA) 4.

Figure 1A:
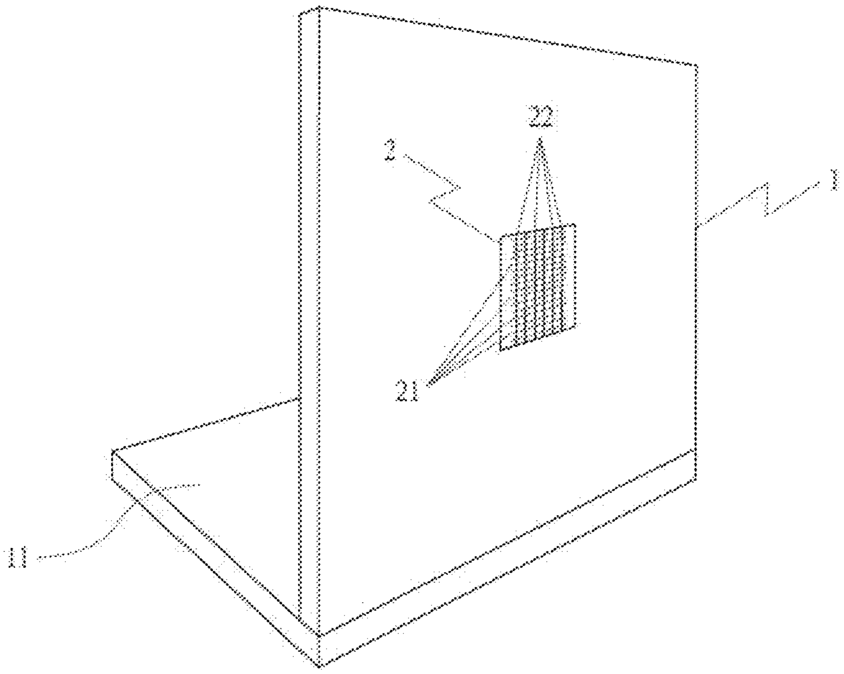
FIG. 1*a* is a schematic diagram illustrating an embodiment of the crack-width calibration plate (CWCP) embedded in the simulated wall (SW) according to the present invention.
Figure 1B:
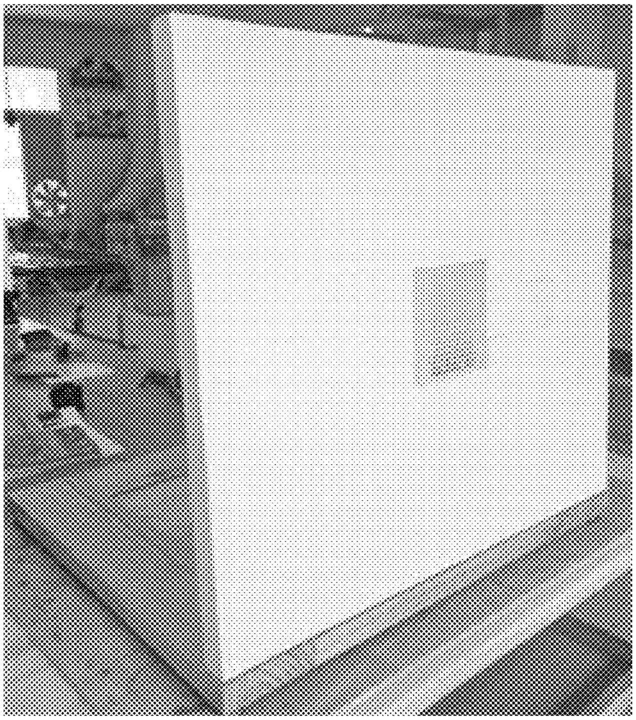
FIG. 1*b* is a photographic view showing the crack-width calibration plate (CWCP) embedded in the simulated wall (SW)
Figure 2A:
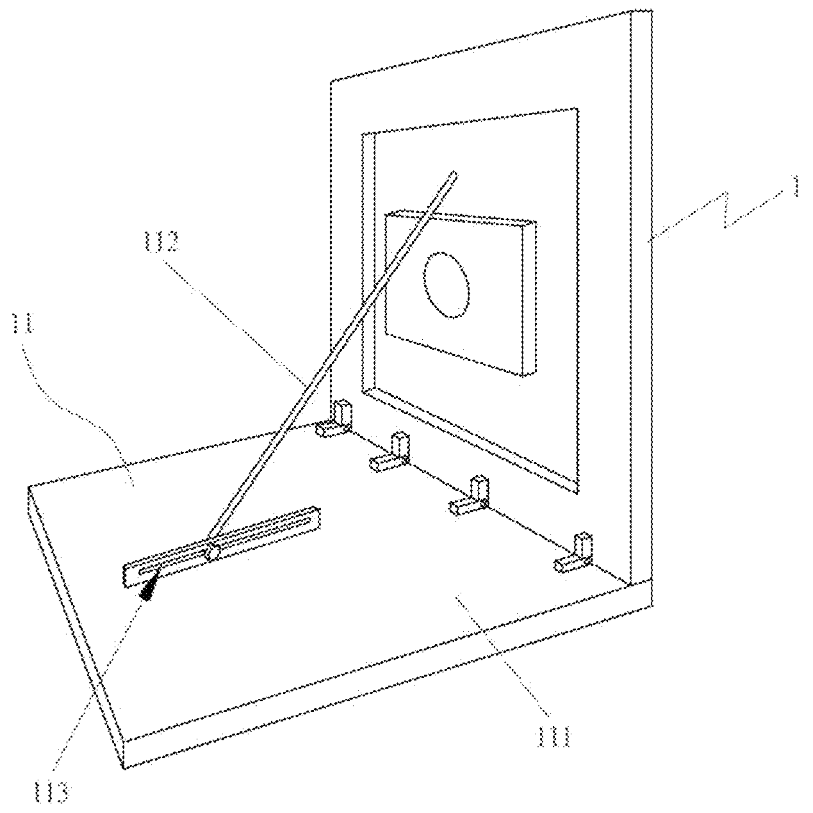
FIG. 2*a* is a schematic diagram illustrating an embodiment of the simulated wall (SW)
Figure 2B:
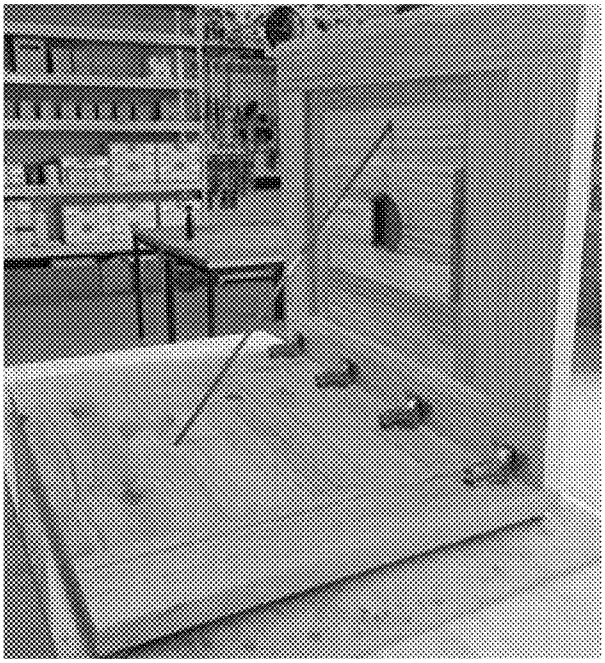
FIG. 2*b* is a photographic view showing a first operational scenario of the simulated wall (SW)

Simulated Wall (SW) 1:

As shown in FIGS. 1*a* and 1*b*, the CWCP 2 is embedded in the SW 1 for conducting standard crack-width measurement tests. The SW 1 is preferably fabricated from wood, which is cost-effective, lightweight, and portable. Wooden simulation walls are also sufficiently precise to replicate the surface characteristics of actual engineering concrete structures or components.

As shown in FIGS. 1*a* to 2*b*, the SW 1 comprises a tilt adjustment mechanism 11 that allows control of its vertical tilt. The adjustment mechanism 11 optionally includes a base 111, a brace rod 112, and a slide groove 113.

Figure 3A:
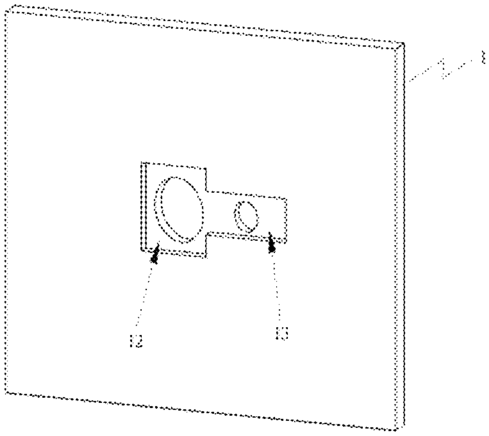
FIG. 3*a* is a schematic diagram showing the square opening and the adjacent slot opening on the simulated wall (SW)
Figure 3B:
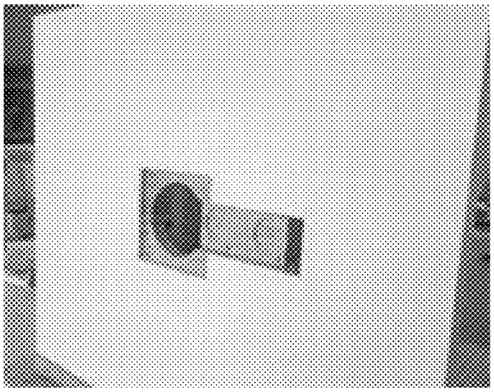
FIG. 3*b* is a photographic view showing a second operational scenario of the simulated wall (SW)
Figure 3C:
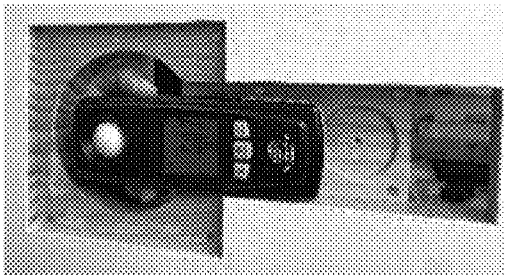
FIG. 3*c* is a photographic view showing a third operational scenario of the simulated wall (SW)
Figure 3D:
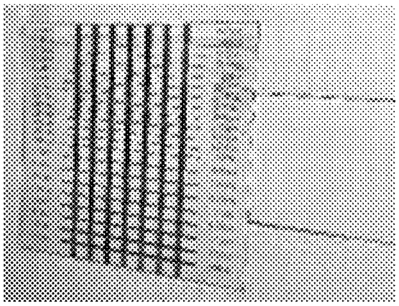
FIG. 3*d* is a photographic view showing a fourth operational scenario of the simulated wall (SW)

As shown in FIGS. 3*a* to 3*d*, the SW 1 features an accommodating square opening 12 and an adjacent slot opening 13. The CWCP 2 is removably embedded within the square opening 12, while the combination of the square opening 12 and the slot opening 13 provides a dedicated space for a lux meter. This configuration allows the illuminance at the surface of the CWCP 2 to be measured before conducting a crack-width measurement test, as illustrated in FIG. 3*c*.

Figure 4A:
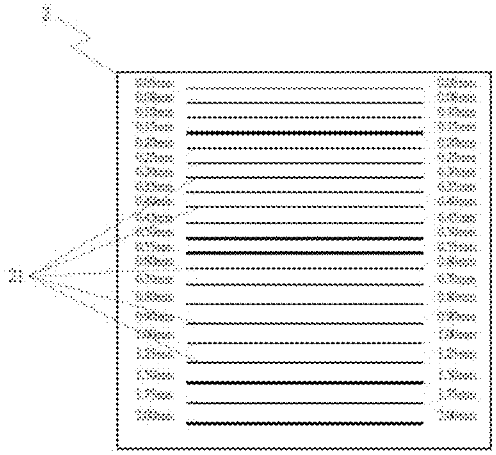
FIG. 4*a* is a schematic diagram illustrating a first embodiment of the crack-width calibration plate (CWCP)
Figure 4B:
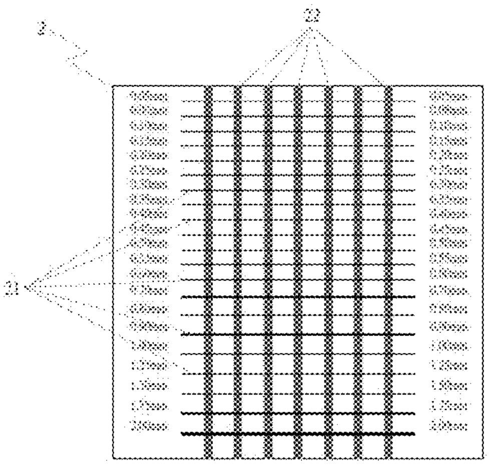
FIG. 4*b* is a schematic diagram illustrating a second embodiment of the crack-width calibration plate (CWCP)
Figure 5A:
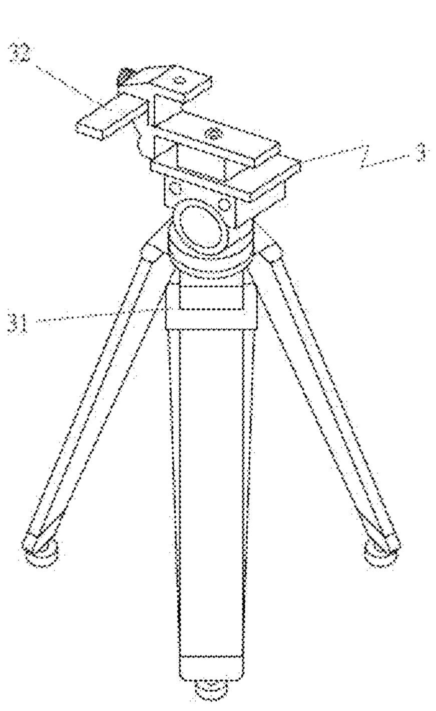
FIG. 5*a* is a schematic diagram illustrating an embodiment of the pose adjusting and fixing device (PAFD)
Figure 5B:
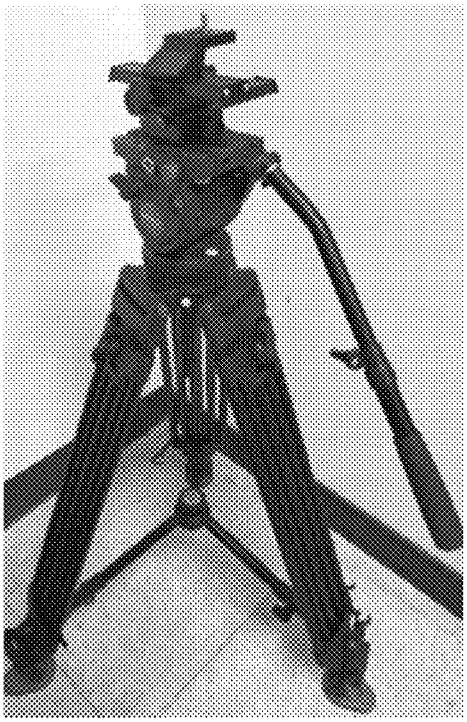
FIG. 5*b* is a first photographic view showing the embodiment of the pose adjusting and fixing device (PAFD)
Figure 5C:
FIG. 5*c* is a photographic view showing the tripod and tripod-head in the embodiment of the pose adjusting and fixing device (PAFD)
Figure 5D:
FIG. 5*d* is a second photographic view showing the embodiment of the pose adjusting and fixing device (PAFD)

Crack Width Calibration Plate (CWCP) 2:

The standard tests required a standardized and repeatable target for crack-width measurements. To achieve this, as shown in FIGS. 4*a* and 4*b*, the crack-width calibration plate (CWCP) 2 is designed with multiple simulated cracks 21, each featuring a distinct crack width. An embodiment of the CWCP 2 as shown in FIGS. 4*b* to 4*d* is dimensioned at 130 mm by 130 mm, with a thickness of 10 mm, and contains 21 simulated cracks 21 with widths ranging from 0.05 mm to 2.00 mm. Each crack extends to a uniform length of 100 mm. This metal CWCP 2 is fabricated using precision laser engraving for 19 cracks with widths from 2.0 mm to 0.10 mm, and a milling cutter for the two finest cracks with widths of 0.08 mm and 0.05 mm. All simulated cracks are engraved to a depth of 1 mm. Seven vertical black stripes 22 were added to the CWCP 2 to mark 14 potential width-measurement points along each of the 21 simulated cracks 21. Photographs of the finished CWCP are shown in FIGS. 4*c* and 4*d*.

The crack-width measurements obtained from the mobile phone app during standard tests must be compared with the corresponding "true" crack-width values to determine the app's measurement error. For this purpose, in an embodiment, three types of precision crack-width measuring magnifiers, as shown in in FIGS. 4*e* and 4*f* and detailed in FIG. 4*g*, were used to manually measure the crack widths at the designated positions on each simulated crack 21 of the CWCP 2. The measurements were conducted by at least three individuals, with each person performing at least two rounds of measurements. For each designated position on the simulated cracks 21 (which were also the positions used by the app for crack-width measurements), at least 30 manual measurements were taken using five crack-width magnifiers (one Baiyi BY-D200XS, two Peak 2016-15X, and two Peak 2008-100X). The two finest cracks with designed widths of 0.05 mm and 0.08 mm were measured only using the two high-precision crack-width magnifiers. Each set of 30 measurements was examined and compared, with outliers removed and measurements redone if necessary. The final true crack-width value was obtained by averaging the valid measurement values at each designated width-measurement position of the cracks. These true values were compared with the app's measurements to determine the measurement error.

Pose Adjusting and Fixing Device (PAFD) 3:

During a standard test, the spatial position of the mobile phone used for testing should undergo a series of coarse and fine adjustments until reaching the desired position, and then remain unchanged. As shown in FIGS. 5*a* to 5*d*, a tripod and tripod-head 31 paired with an additional accessory 32 can be as the pose adjusting and fixing device (PAFD) 3 for the phone used for testing. An accessory 32 attached on top of the tripod-head (FIGS. 5*a*, 5*b*, and 5*d*) allows for perpendicular bidirectional translational adjustments.

Figure 6:
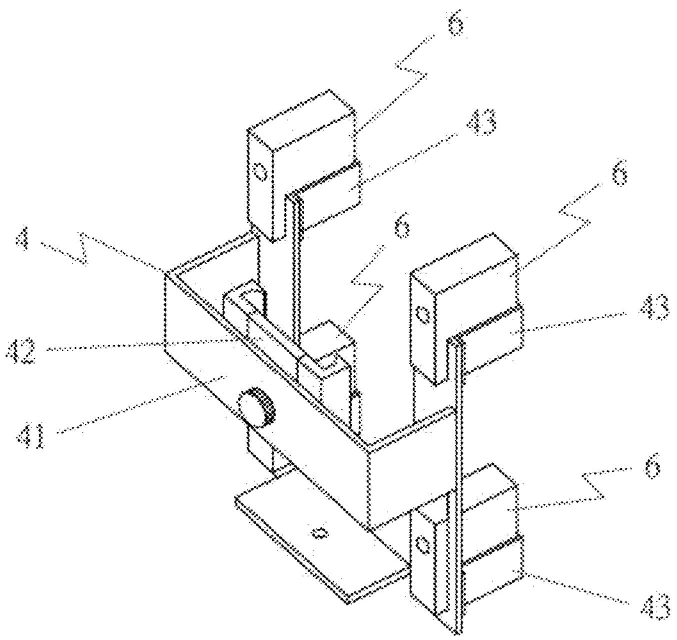
FIG. 6 is a schematic diagram illustrating an embodiment of the metal holder and the laser displacement sensors (LDSs) within the spatial distance measuring assemblage (SDMA)
Figure 7A:
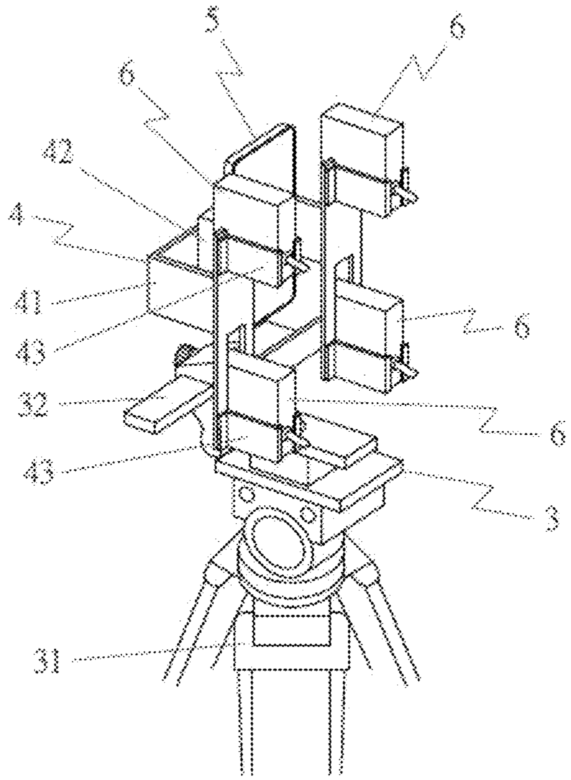
FIG. 7*a* is a schematic diagram illustrating the embodiment of the spatial distance measuring assemblage (SDMA) mounted on top of the pose adjusting and fixing device (PAFD)
Figure 7B:
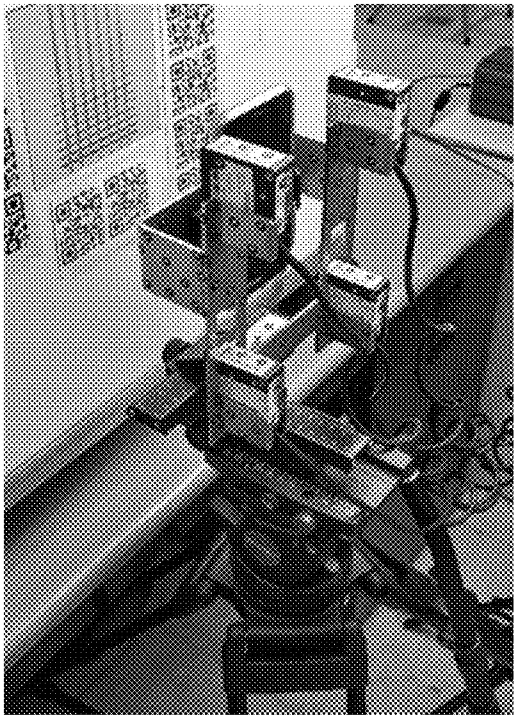
FIG. 7*b* is a first photographic view showing the embodiment of the spatial distance measuring assemblage (SDMA) mounted on top of the pose adjusting and fixing device (PAFD)
Figure 7C:
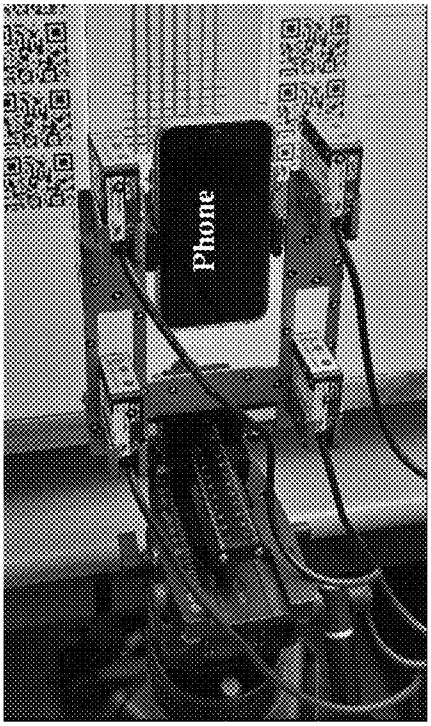
FIG. 7*c* is a second photographic view showing the embodiment of the spatial distance measuring assemblage (SDMA) mounted on top of the pose adjusting and fixing device (PAFD)

Spatial Distance Measuring Assemblage (SDMA) 4:

The spatial position of the phone must be discerned before it can be adjusted using the PAFD 3. A specialized spatial distance measuring assemblage (SDMA) 4 was developed to measure the phone's spatial position relative to the simulated wall (SW) 1. As illustrated in FIGS. 6 and 7*a*, the SDMA 4 consists of a metal holder 41, four laser displacement sensors (LDSs) 6, and the mobile phone 5 used for testing. As illustrated in FIGS. 6 to 7*c*, the mobile phone 5 is securely held at the center of the SDMA 4 using a smartphone grip 42, while the four u-shaped sockets 43 positioned near the corners of the SDMA 4 fasten the four LDSs 6. As illustrated in FIGS. 7*a* to 7*c*, the SDMA 4 is mounted on top of the PAFD 3.

Figure 8A:
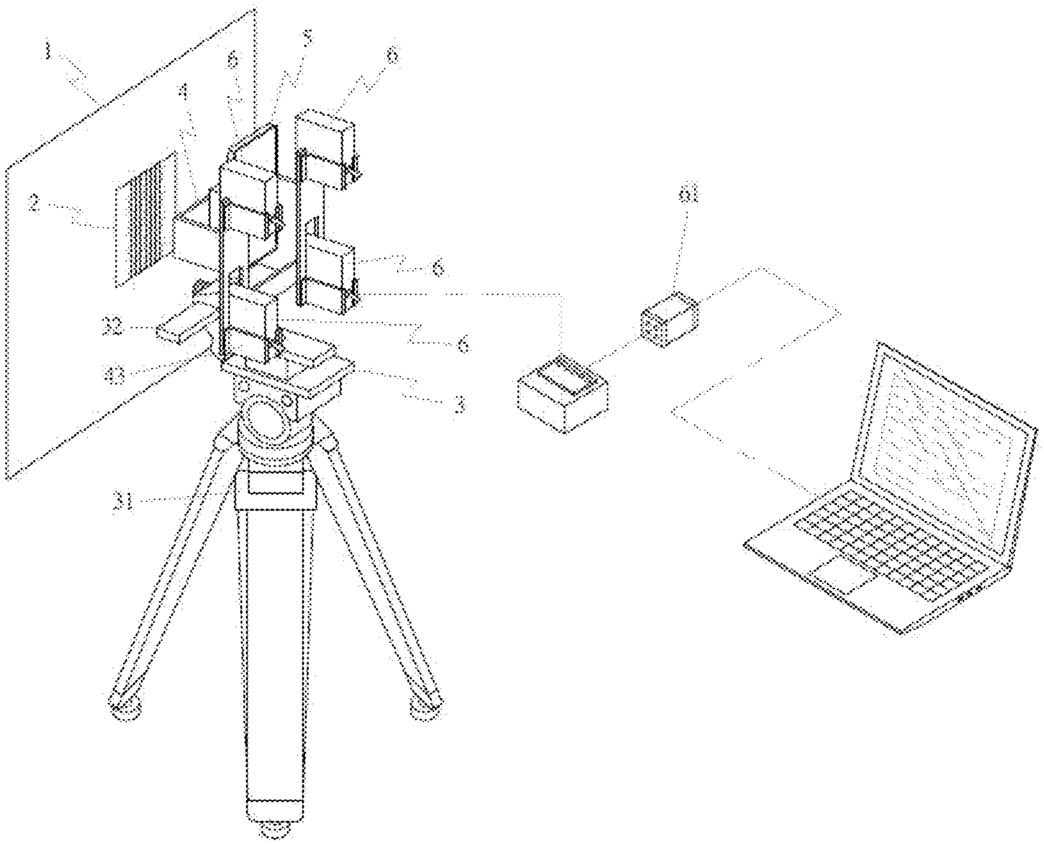
FIG. 8*a* is a schematic diagram illustrating an embodiment of the overall setup of the standard apparatus.
Figure 8B:
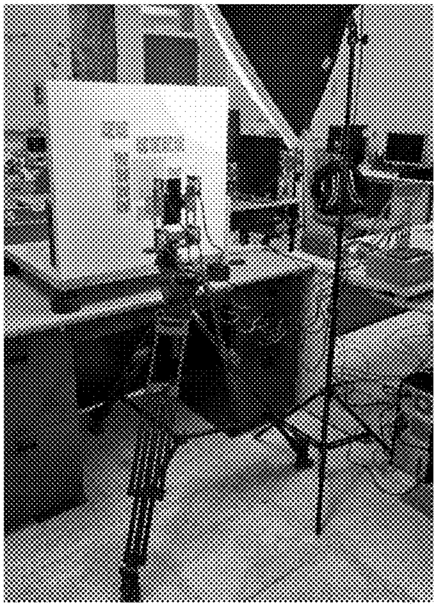
FIG. 8*b* is a photographic view showing a first operational scenario of the overall setup of the standard apparatus.
Figure 8C:
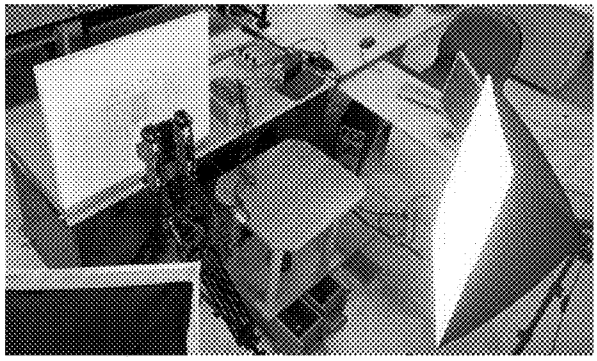
FIG. 8*c* is a photographic view showing a second operational scenario of the overall setup of the standard apparatus.
Figure 8D:
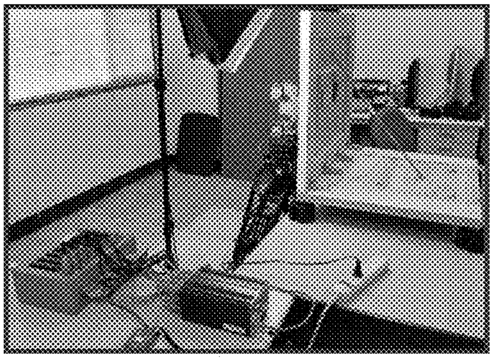
FIG. 8*d* is a photographic view showing a third operational scenario of the overall setup of the standard apparatus.
Figure 8E:
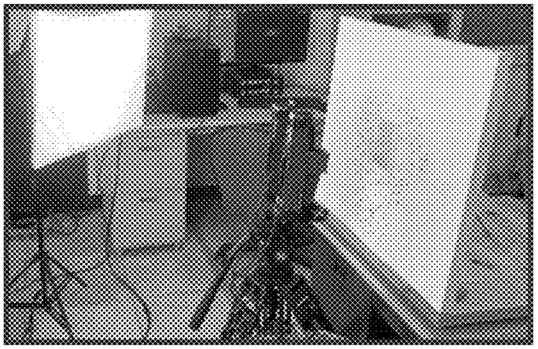
FIG. 8*e* is a photographic view showing a fourth operational scenario of the overall setup of the standard apparatus.
Figure 9A:
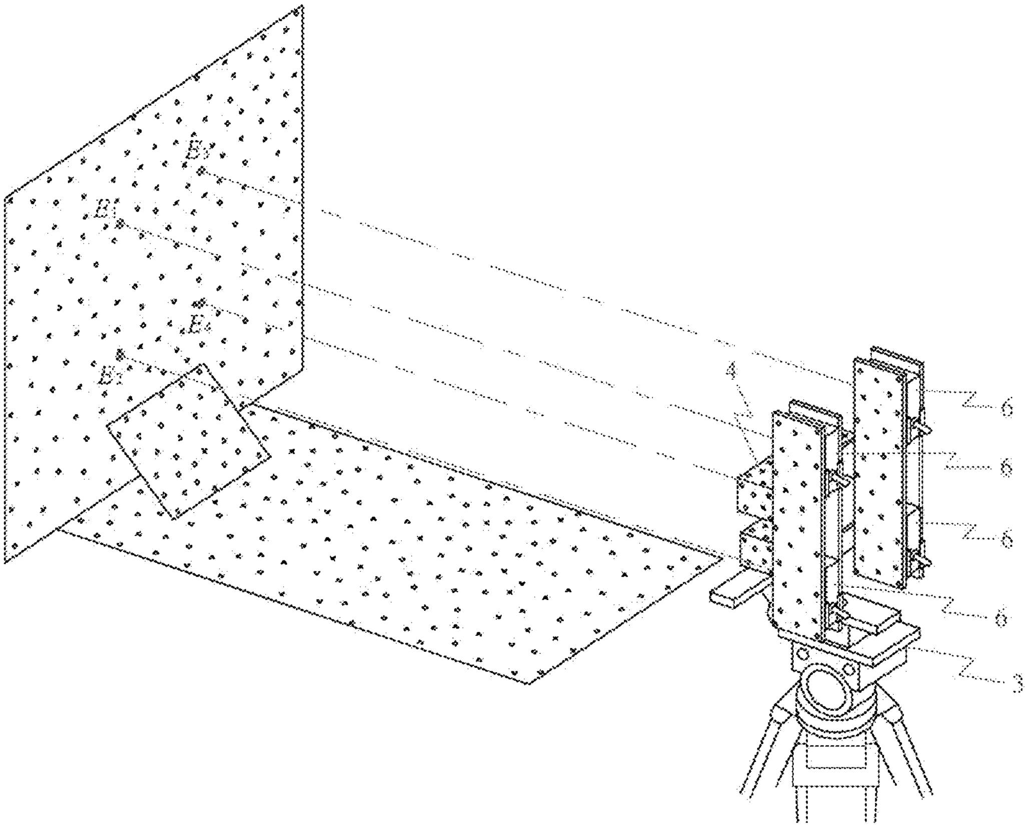
FIG. 9*a* is a schematic diagram illustrating the Stage 1 setup in the two-stage method.
Figure 9B:
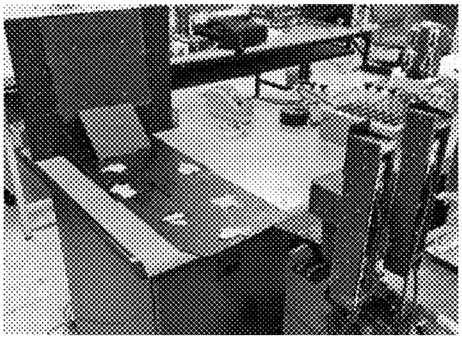
FIG. 9*b* is a photographic view showing a first operational scenario of Stage 1 in the two-stage method.
Figure 9C:
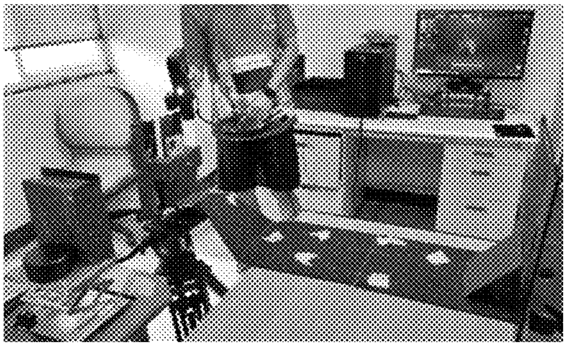
FIG. 9*c* is a photographic view showing a second operational scenario of Stage 1 in the two-stage method.

Overall Setup of the Standard Apparatus:

FIG. 8*a* illustrates the complete setup of the standard apparatus for crack-width measurement tests, while FIGS. 8*b* to 8*e* present photographs of this setup. The SDMA 4 is mounted on top of the PAFD 3, with the phone 5 and the four LDSs 6 aimed at the SW 1 and the embedded CWCP 2. The measurement signals from the four LDSs 6 are fed to a data logger 61, which is connected to a computer for real-time calculation and display of results. During a standard crack-width measurement test, the four LDSs 6 continuously measure the spatial distances from the four laser-emitting points to their terminal points on the SW 1. These LDS measurements are used simultaneously to calculate and display the phone's spatial position relative to the SW 1. With this continuous feedback, the SDMA 4 can be adjusted (translated and/or rotated) via the PAFD 3 to adjust the phone's relative spatial position during testing.

Two-Stage Methodology for Spatial Position Determination:

In this invention, determining the spatial position of the mobile phone relative to a test wall is a critical experimental parameter. A specialized two-stage method is implemented to simultaneously calculate and display this spatial position. Stages 1 and 2 of the method are illustrated in FIGS. 9*a*-12. and described in the following two paragraphs.

Stage 1—Determining the Spatial Relationship Between the LDSs and Mobile Phone Before Crack-Width Measurement:

FIGS. 9*a* to 9*e* and FIG. 10 illustrate Stage 1 of the method. Before a crack-width measurement test is conducted, 3D scanning is utilized to determine the spatial relationship between the mobile phone 5 and the four LDSs 6 in the SDMA 4. The outcome of this stage is the determination of the 3D coordinates of eight spatial points, $P_1$-$P_4$ and $S_1$-$S_4$, and four 3D unit vectors, û1-û4 (FIG. 10). The four points $P_1$-$P_4$, representing the corners of the mobile phone 5, determine the spatial position of the phone 5. The four points $S_1$-$S_4$, representing the laser-emitting points of the four LDSs 6, along with the four unit vectors $\hat{u}_1$-$\hat{u}_4$, pointing from the laser-emitting points ($S_1$-$S_4$) toward their terminal points, determine the spatial positions and directions of the four LDSs' laser beams. To enhance the accuracy of 3D scanning, the metal holder 41 is wrapped to create relatively regular exterior surfaces (FIGS. 9*a* to 9*e*).

Stage 2—Real—Time Distance Calculation Between the Mobile Phone and Test Wall Using LDSs Readings:

The subsequent crack-width measurement test is conducted during Stage 2, as illustrated in FIGS. 11*a* to 11*c* and FIG. 12. The SDMA 4 and the PAFD 3 are repositioned to face the test wall, and the real-time distance measurements $d_1$-$d_4$ obtained from the four LDSs 6, along with the previously determined 3D coordinates of $P_1$-$P_4$ and $S_1$-$S_4$ and the four unit vectors $\hat{u}_1$-$\hat{u}_4$, are used to synchronously calculate and display the four average distances $K_i$ from the phone's corner points $P_i$ (i=1-4) to the test wall (FIG. 12). These $K_i$ values can then be used to move (translate and/or rotate) the SDMA 4 using the PAFD 3, thereby adjusting the phone's relative spatial position during the test.

Figure 11A:
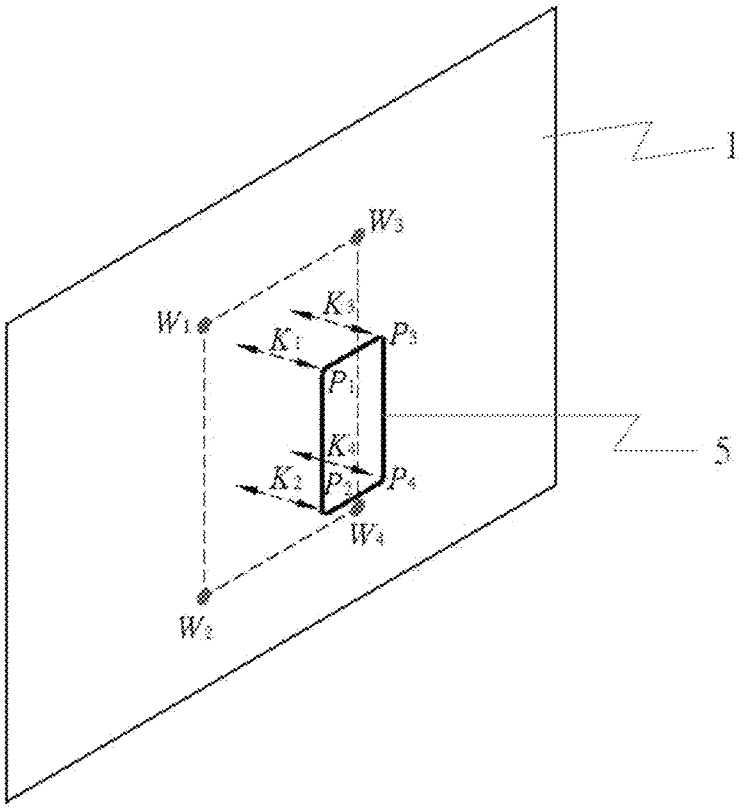
FIG. 11*a* is a schematic diagram illustrating the spatial geometric relationship among points $P_1$-$P_4$, points $W_1$-$W_4$, and distances $K_1$-$K_4$ during Stage 2 of the two-stage method.
Figure 11B:
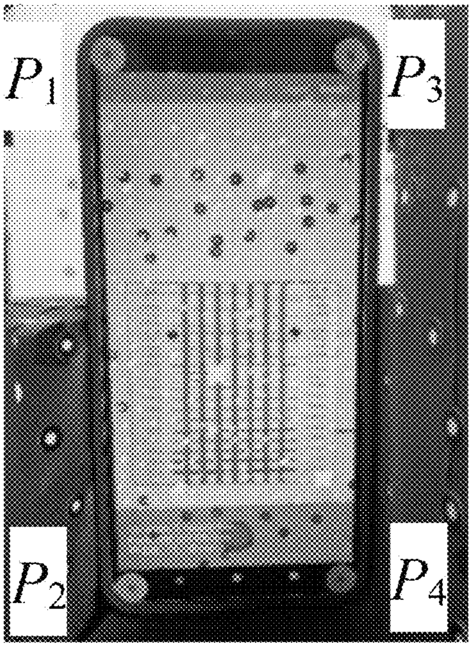
FIG. 11*b* is a photographic illustration showing a first operational scenario of Stage 2 in the two-stage method.
Figure 11C:
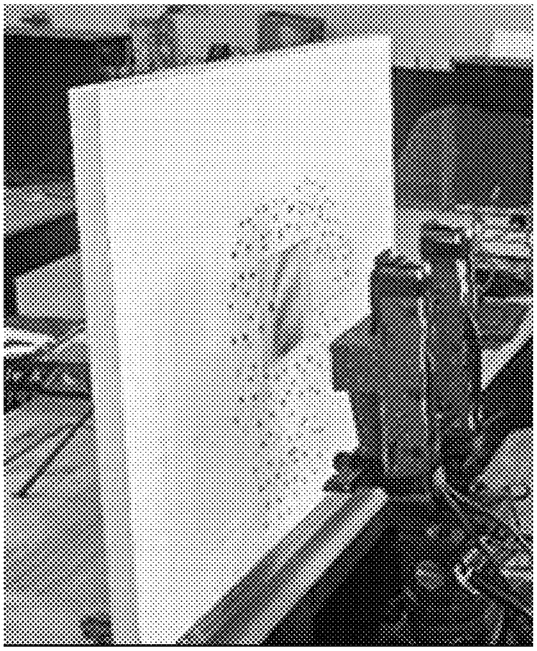
FIG. 11*c* is a photographic illustration showing a second operational scenario of Stage 2 in the two-stage method.

Physical Meaning of the Test Method:

The spatial geometric relationships among the phone's corner points $P_1$-$P_4$, the laser terminal points $W_1$-$W_4$ on the test wall, and the average distances $K_1$-$K_4$ from $P_1$-$P_4$ to the test wall are illustrated in FIGS. 11*a* to 11*c*. In fact, $K_i=(1/4)\cdot(Q_{i1}+Q_{i2}+Q_{i3}+Q_{i4})$ (FIG. 12) is mathematically equivalent to the distance from the phone's corner point $P_i$ to an "average spatial plane," a plane that is interpolated from $W_1$-$W_4$. A typical concrete crack surface is rarely a perfect mathematical plane, given that it aligns only to the precision of surface finishing or similar construction standards (this also justifies the use of the wooden SW 1). When using a phone app to measure a concrete crack surface, the user is essentially engaging with a "perceived crack plane." Therefore, the distance $K_i$ from point $P_i$ to the average spatial plane essentially simulates the distance from $P_i$ to this user-perceived crack plane. In other words, this test method, in essence, simulates the user-perceived crack plane by using the average spatial plane interpolated from the four laser terminal points $W_1$-$W_4$ on the wall. This innovative approach, which mimics actual engineering conditions, should be highly reasonable and appropriate.

Methodology for Precise Distance Measurement Using LDSs:

As mentioned above, in Stage 2, the real-time measured distances $d_1$-$d_4$ from the four LDSs 6 are used to synchronously calculate and display the four $K_i$ values. These distances $d_1$-$d_4$ represent the absolute spatial distances from the laser-emitting points to their terminal points on the test wall (see FIG. 11*a* and FIG. 12). However, these LDSs 6 are not rangefinders. Typically, high-precision LDSs, such as those used in experiments and connected to data loggers, function as displacement transducers. Standard practice with displacement sensors or transducers involves setting up the sensors in a fixed location and measuring only the relative displacement values with respect to an initial reference position. Thus, while the four LDSs 6 have a specified effective measurement range, they lack a precise fixed reference point. This poses a challenge, as the LDSs 6 need to accurately provide the absolute distances $d_1$-$d_4$ while mounted on the nonstationary stainless-steel holder 41. To address this challenge, this invention develops an innovative methodology to realize high-precision, real-time measurements of the four absolute spatial distances $d_1$ using standard LDSs.

Figure 14:
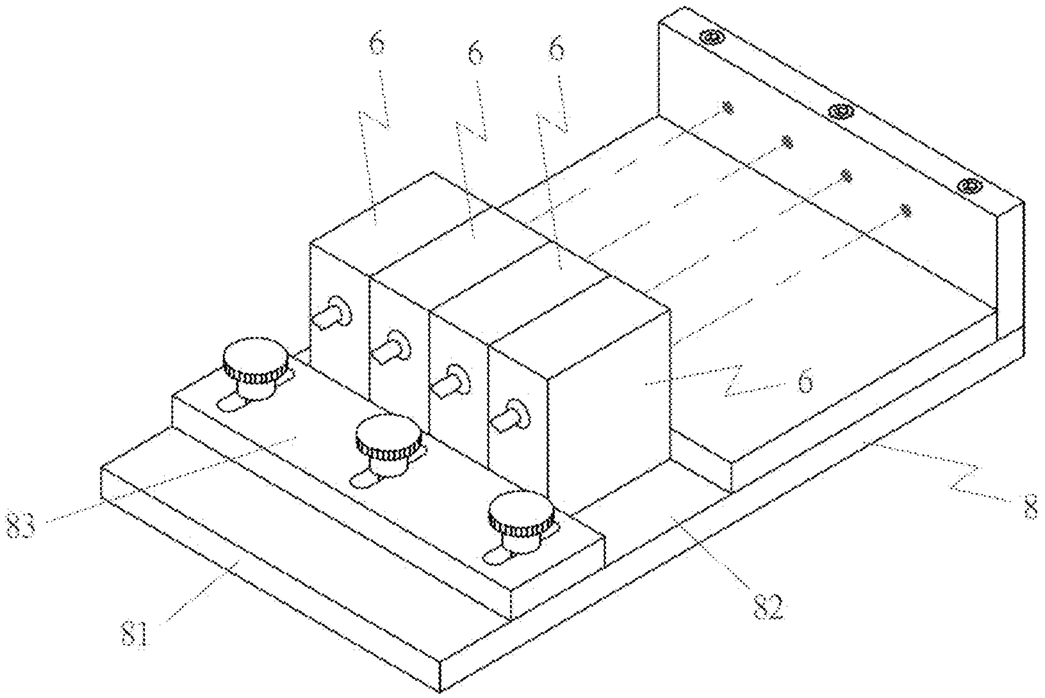
FIG. 14 is a schematic diagram showing the usage state of the zero-calibration caliper (ZCC)
Figure 15A:
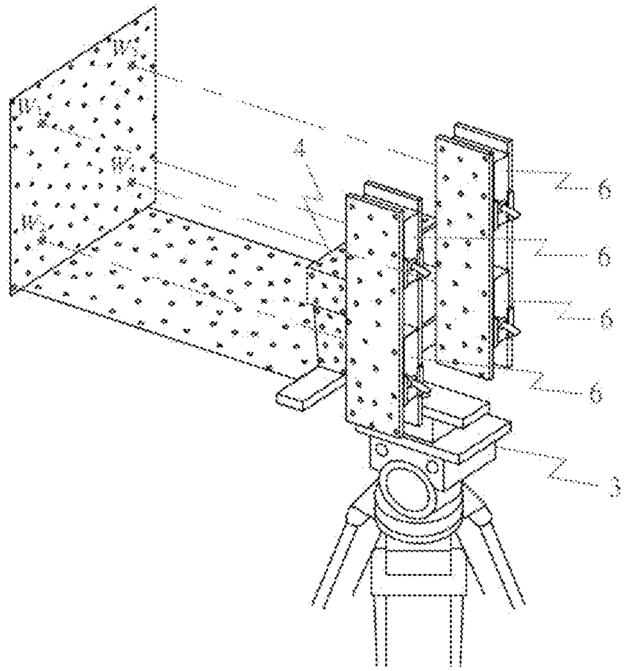
FIG. 15*a* is a schematic diagram illustrating the Stage 2 setup in a validation experiment.
Figure 15B:
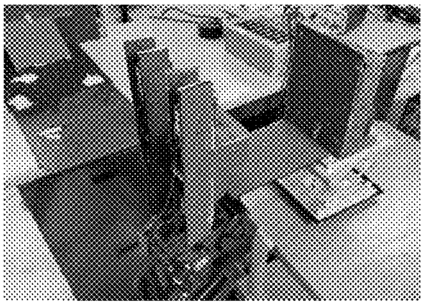
FIG. 15*b* is a first photographic view showing the Stage 2 setup in a validation experiment.
Figure 15C:
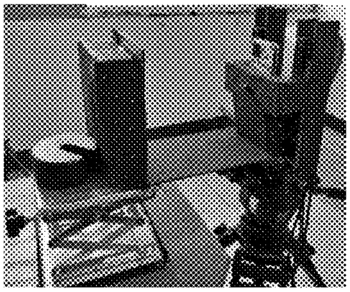
FIG. 15*c* is a second photographic view showing the Stage 2 setup in a validation experiment.
Figure 15D:
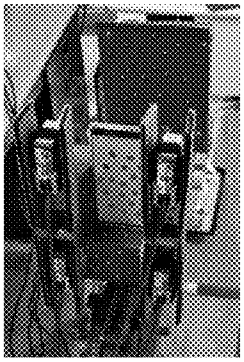
FIG. 15*d* is a third photographic view showing the Stage 2 setup in a validation experiment.
Figure 15E:
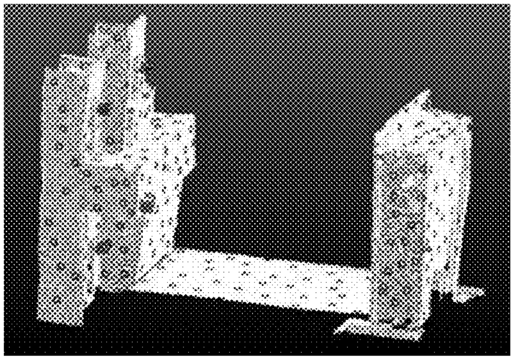
FIG. 15*e* is an image illustrating the 3D point cloud generated during Stage 2 of a validation experiment.
Figure 15F:
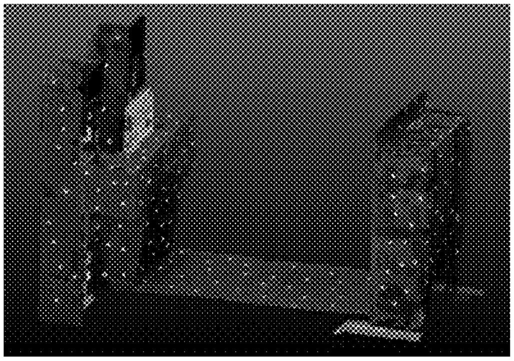
FIG. 15*f* is an image illustrating the 3D texture generated by combining the point cloud data with camera images during Stage 2 of a validation experiment.
Figure 15G:
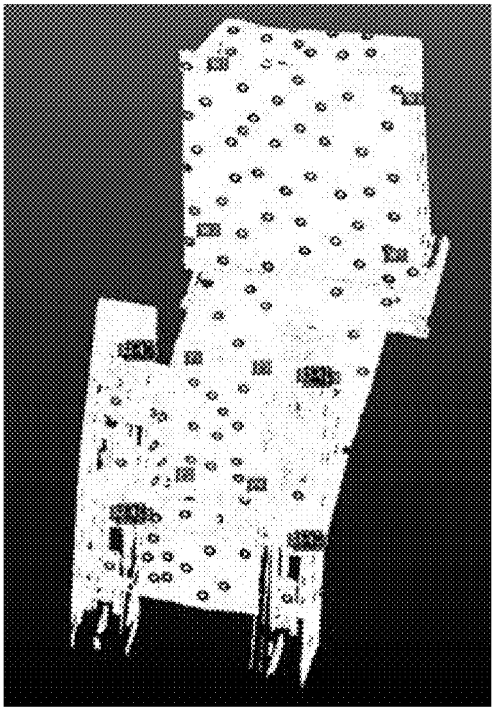
FIG. 15*g* is an image illustrating the 3D point cloud from a different perspective, generated during Stage 2 of a validation experiment.
Figure 15H:
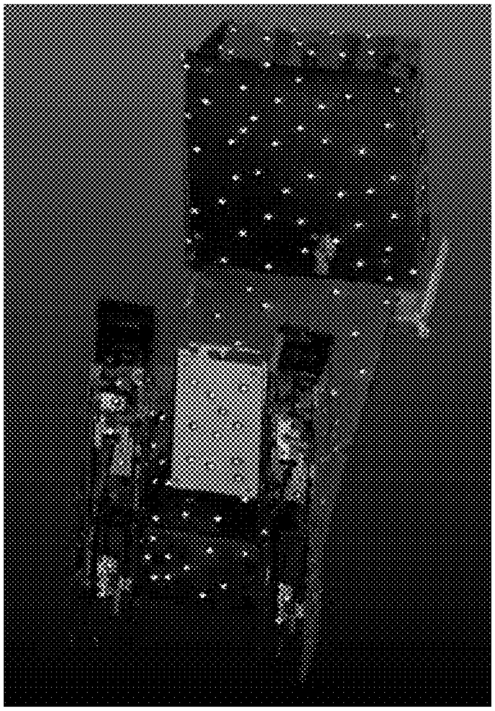
FIG. 15*h* is another image illustrating the 3D texture from a different perspective, generated by combining the point cloud data with camera images during Stage 2 of a validation experiment.

Zero-Calibration Caliper (ZCC) 8:

In this innovative methodology, a specialized metal "zero-calibration caliper" (ZCC) 8 is first devised to set an initial fixed reference for the four LDSs 6. As illustrated in FIGS. 13 and 14, the ZCC 8 features a U-shaped groove 82 on its base plate 81 to accommodate the four LDSs 6. A metal plate 83 on the one side of the groove 82 can move laterally to clamp the LDSs 6 in place, while the other side of the groove provides a precise fixed distance of 115 mm for the clamped LDSs 6. This 115 mm distance can be produced with a typical CNC machining precision tolerance of 0.1 mm. Before the LDSs 6 are placed on the stainless-steel holder 41 for a standard test, the ZCC 8 is used to clamp the four LDSs 6 in place (FIG. 14), after which the data logger 61 is operated to zero the displacement readings. After the execution of the "zeroing" operation on the data logger 61, the initial readings for all four LDS channels are nearly zero, and then each reading is incremented by 115 mm synchronously. This calculation yields the absolute distance values representing the distance from the laser-emitting points of the LDSs 6 to their terminal points on the ZCC 8 (FIG. 14). After the zeroing operation, the four LDSs 6 are reattached to the stainless-steel holder 41 for subsequent test measurements. At this stage, the real-time measurements displayed by the data logger reflect the absolute distances $$d_i^{LDS}$$

between the laser-emitting points and their terminal points on the test wall.

Validation Experiments and Further Subtle Corrections:

To verify the accuracy of the distance measurements $$d_i^{LDS}$$

obtained after the ZCC zeroing operation, 3D scanning was employed to independently measure the corresponding spatial distances $$d_i^{3D}.$$

Comparisons revealed small systematic biases $$\Delta d_i = d_i^{LDS} - d_i^{3D},$$

ranging from −1.2 mm to −0.3 mm. The mechanical ZCC zeroing operation alone cannot eliminate this baseline offset. By conducting validation experiments involving multiple comparisons between the ZCC-zeroed measurements $$d_i^{LDS}$$

and the corresponding 3D scanning measurements $$d_i^{3D},$$

further subtle corrections were applied to $$d_i^{LDS}.$$

These subtle correction equations were incorporated into the real-time calculation program of the data logger 61. Thus, this methodology successfully achieves high-precision, real-time measurements of the four absolute spatial distances $d_i$ using standard LDSs.

Stage 2 of the Validation Experiments:

To verify the accuracy of the LDSs' measurements $$d_i^{LDS}$$

and their use in calculating the $$K_i^{LDS}$$

(FIG. 12), validation experiments were conducted within the framework of the proposed methodology described above. These experiments also included the previously described two-stage procedure. In Stage 1 of these validation experiments, the setup and method were the same as those illustrated in FIGS. 9*a* to 9*c*. As shown in FIGS. 15*a* to 15*d*, the Stage 2 procedure of these validation experiments was similar to that of the crack-width measurements shown in FIGS. 8*a* to 8*e*, with the sole difference being that the test wall in FIGS. 15*a* to 15*d* was not the wooden SW 1. This modification was made to facilitate subsequent 3D scanning and enhance the accuracy of distance measurements derived from the 3D point cloud. A 3D scanner was used to scan the setup and wall (FIGS. 15*a* to 15*d*), generating the 3D point cloud illustrated in FIGS. 15*e* to 15*h*. From this 3D point cloud, the spatial distances $$d_1^{3D} - d_4^{3D}$$

and $$K_1^{3D} - K_4^{3D}$$

were measured compared with the $$d_i^{LDS} \text{ and } K_i^{LDS}$$

values obtained from the LDS/data logger measurements. The validation experiment was repeated numerous times. The results showed that for the LDS measurement values of $$d_i^{LDS}$$

and the real-time calculated distance values of $$K_i^{LDS},$$

most of their differences relative to the corresponding 3D scanning/point-cloud measurement values $$d_i^{3D} \text{ and } K_i^{3D}$$

could be controlled within ranges of ±1.0 mm and ±0.8 mm, respectively. These ranges (±1.0 mm and ±0.8 mm) for the measurement differences ($\Delta d_i$ and $\Delta K_i$) were adopted as permissible criteria in the standard experimental procedure presented in the following paragraphs.

Figure 16:
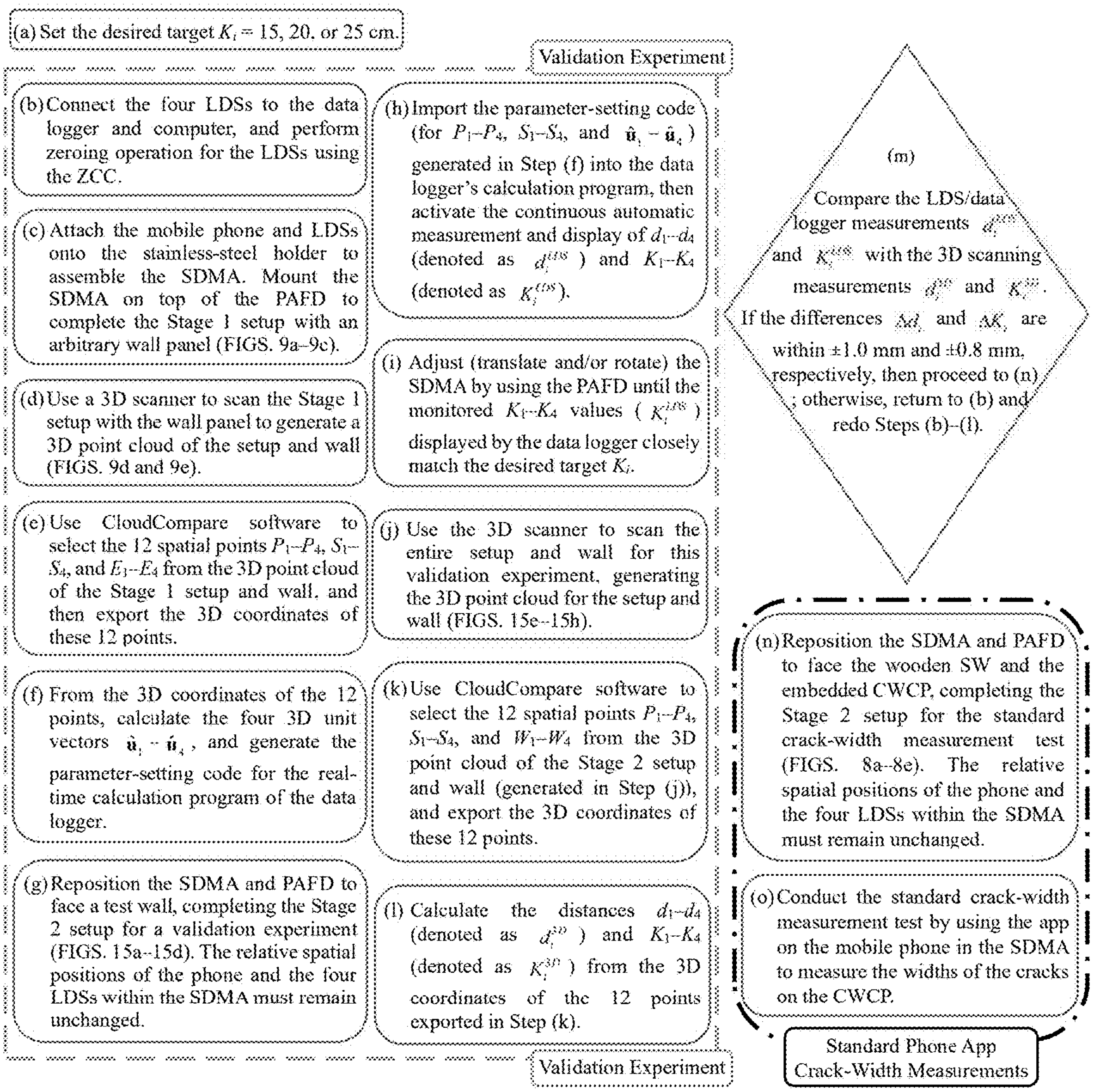
FIG. 16 is a flow chart illustrating the procedural steps in an embodiment the standard experimental procedure of the standard tests.

Standard Experimental Procedure:

Based on the aforementioned investigation results, a standard experimental procedure is established to conduct the standard tests for validating the accuracy of mobile phone apps in measure concrete crack widths. FIG. 16 illustrates and summarizes the 15 steps ((a) through (o)) of this procedure. The standard crack-width measurement test begins by determining the target $K_i$ in Step (a). Steps (b) through (l) comprise a validation experiment within the standard test. The final steps, (n) and (o), correspond to the Stage 2 procedure of the standard test, where a mobile phone app is used to measure crack widths on the CWCP 2 embedded in the wooden SW 1 (FIGS. 8*a* to 8*e*).

As previously described, the validation experiment (Steps (b) through (l)) includes the two-stage procedure, with Stage 2 conducted using the setup shown in FIGS. 15*a*-15*d*, excluding the wooden SW 1. In Step (m), the results of this validation experiment-comprising the 3D scanning measurements of distances $$d_1^{3D} - d_4^{3D} \text{ and } K_1^{3D} - K_4^{3D},$$

as well as the corresponding values $$d_i^{LDS} \text{ and } K_i^{LDS}$$

obtained from the LDS/data logger—are compared. The differences, $\Delta d_i$ and $\Delta K_i$ are then checked against the allowable limits (±1.0 mm and ±0.8 mm, respectively). If these differences fall within the permissible range, the final two steps ((n) and (o)) are performed. If not, the entire validation experiment (Steps (b) through (l)) must be repeated before proceeding.

Application Examples of the Standard Experimental Procedure

The standard experimental procedure (FIG. 16) was applied to conduct standard crack-width measurement tests on a preliminary Android app developed in research projects led by the inventors. This app employs Google's ARCore-AR routines to detect a physical distance on the measurement surface and determine the physical size per unit pixel for the captured images. Thus, the app can measure crack widths independently, without any auxiliary apparatus. Part of the app's usage is demonstrated in two videos on YouTube (websites: https://youtube.com/shorts/MCmQjrtBR8Y; https://youtu.be/UwgEolddrms).

Procedure for Crack-Width Measurements in a Standard Test:

In the final Stage 2 (Steps (n) and (o) in FIG. 16) of these standard tests, the app, installed on a Pixel 8 Pro mobile phone within the SDMA 4, was used to measure crack widths on the CWCP 2 embedded in the SW 1 (FIGS. 8*a* to 8*e*).

FIG. 17 presents the detailed operating procedure of steps (n) and (o) in these standard tests, while FIGS. 18*a* to 18*g* provide photographs of this Stage 2 procedure.

Figure 18A:
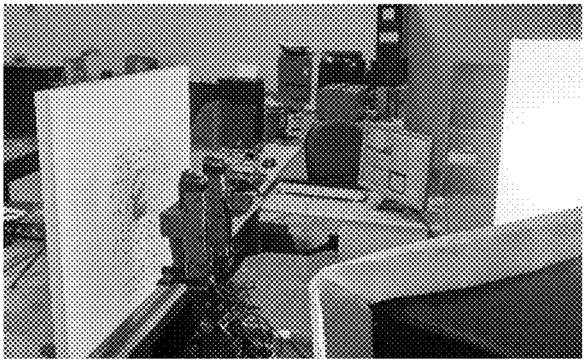
FIG. 18*a* to FIG. 18*g* are photographic illustrations showing different steps of the operational process during the standard phone app crack-width measurements.
Figure 18B:
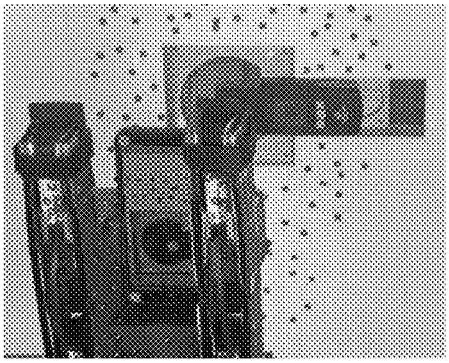
Figure 18C:
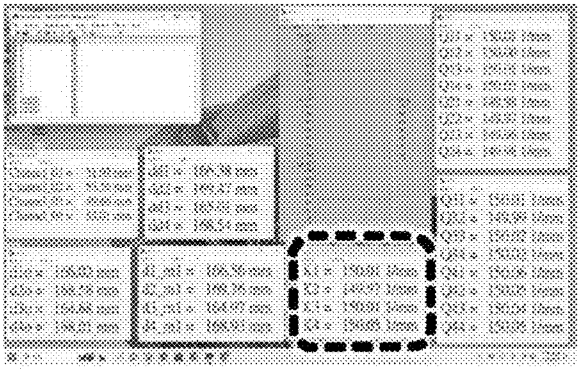
Figure 18D:
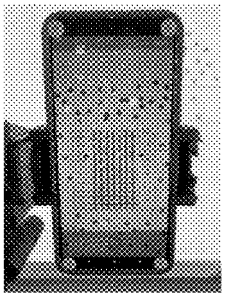
Figure 18E:
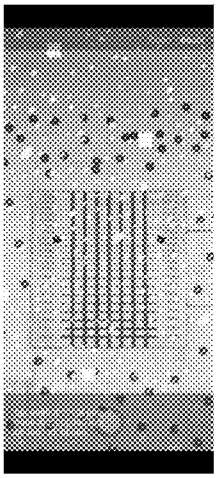
Figure 18F:
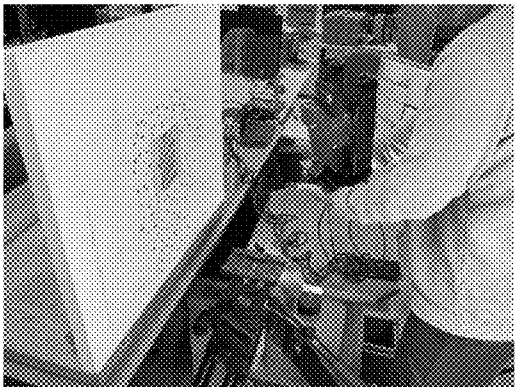
Figure 18G:
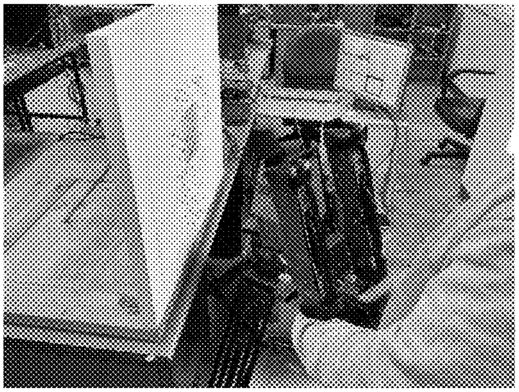

FIG. 17 delineates nine specific steps (<1> to <9>) for performing crack-width measurements using the mobile phone app after the validation experiment has been successfully completed (Step (m) in FIG. 16). The first two steps (Steps <1> and <2>) involve repositioning the SDMA-PAFD assembly to face the wooden SW 1 (FIG. 18*a*) and then checking and adjusting the lighting conditions (FIG. 18*b*). Steps <3> through <8> include pre-aligning the mobile phone (<3>), performing AR detection (<4>), re-aligning the mobile phone (<5>), capturing a crack image (<6>), and measuring crack widths in the image (<7> and <8>). The final step (<9>) is to repeat steps <3> to <8> if necessary, to capture another crack image and measure its crack widths.

It should be noted that AR (augmented-reality) detection in Step <4> is required for the preliminary app to detect physical distances using ARCore routines. For an app that does not use AR detection, Step (<4>) can be excluded, and Steps <3> and <5> are consolidated into a single step.

Figure 19:
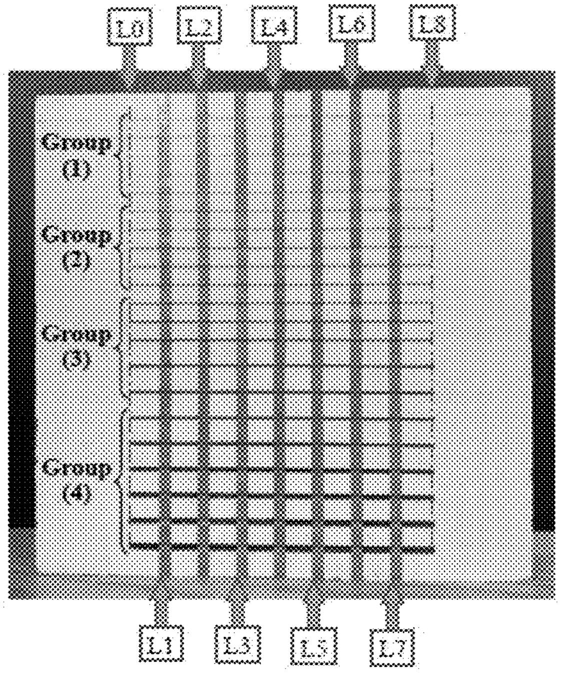
FIG. 19 is an explanatory diagram illustrating the grouping of simulated cracks and the measurement point marking line positions on the crack-width calibration plate (CWCP)

For capturing a crack image (Steps <3>, <5>, and <6> for the preliminary app), the CWCP cracks are divided into four groups, as depicted in FIG. 19. During Steps <3> and <5> (FIG. 17), the vertical center line (red) in the phone-app's preview screen is aligned with the CWCP's L4 edge (FIG. 19), and the horizontal center line (red) is aligned with the center of a desired crack. This horizontal alignment corresponds to the center crack in each group shown in FIG. 19. In other words, for each of the four groups on the CWCP 2, the phone is aligned accordingly (Steps <3> and <5>), and a crack image is captured (Step <5>). Consequently, a total of four crack images, one for each group (FIG. 19), are captured during a complete standard test. For each crack in a captured image, the app measures its widths at three positions (L2, L4, and L6 edges in FIG. 19). Each captured image thus contains 15 or 18 crack-width values, depending on whether the group has 5 cracks (Groups 1-3) or 6 cracks (Group 4) on the CWCP 2.

Examples of Experimental Results

Figure 20A:
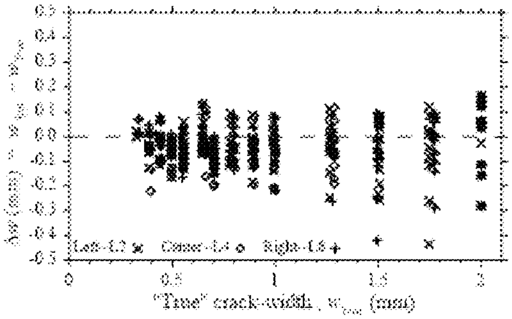
FIG. 20*a* is a first experimental data graph illustrating the results of a first group of standard tests.
Figure 20B:
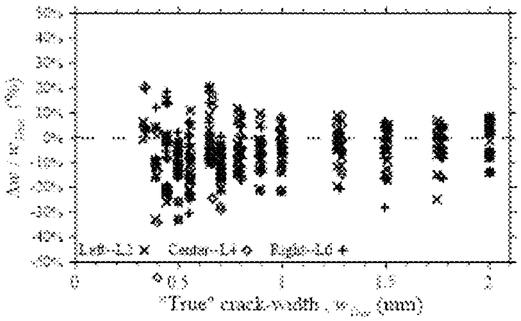
FIG. 20*b* is a second experimental data graph illustrating the results of the first group of standard tests.
Figure 20C:
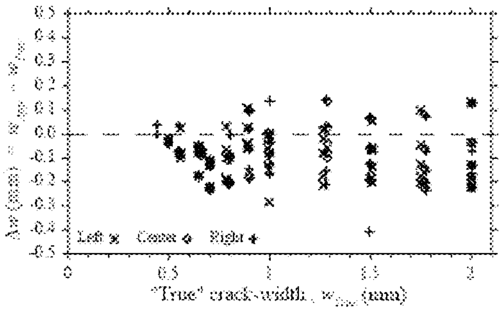
FIG. 20*c* is a first experimental data graph illustrating the results of a second group of standard tests.
Figure 20D:
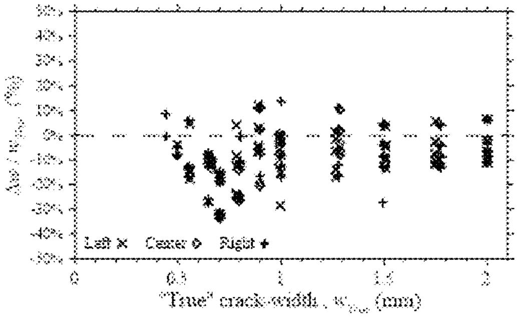
FIG. 20*d* is a second experimental data graph illustrating the results of the second group of standard tests.
Figure 21A:
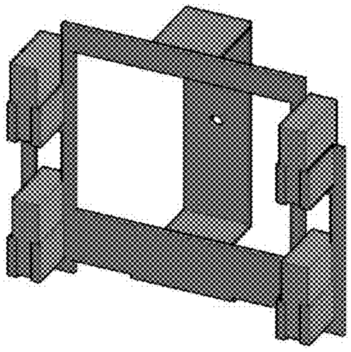
FIG. 21*a* is a first schematic diagram illustrating a stainless-steel holder in an SDMA configured to hold a mobile phone in a horizontal (landscape) orientation.
Figure 21B:
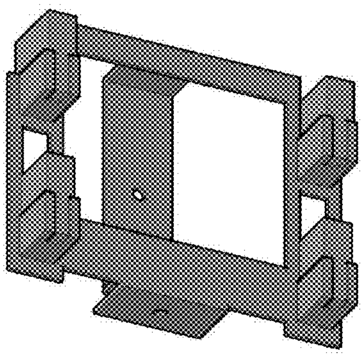
FIG. 21*b* is a second schematic diagram illustrating a stainless-steel holder in an SDMA configured to hold a mobile phone in a horizontal (landscape) orientation.
Figure 21C:
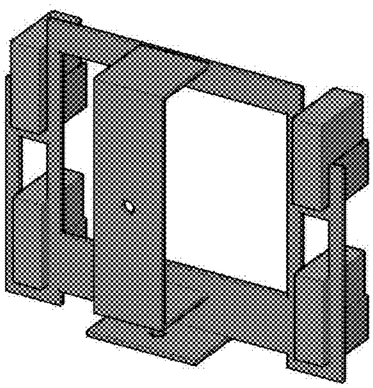
FIG. 21*c* is a third schematic diagram illustrating a stainless-steel holder in an SDMA configured to hold a mobile phone in a horizontal (landscape) orientation.
Figure 21D:
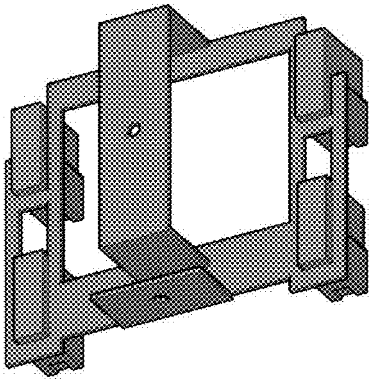
FIG. 21*d* is a fourth schematic diagram illustrating a stainless-steel holder in an SDMA configured to hold a mobile phone in a horizontal (landscape) orientation.
Figure 21E:
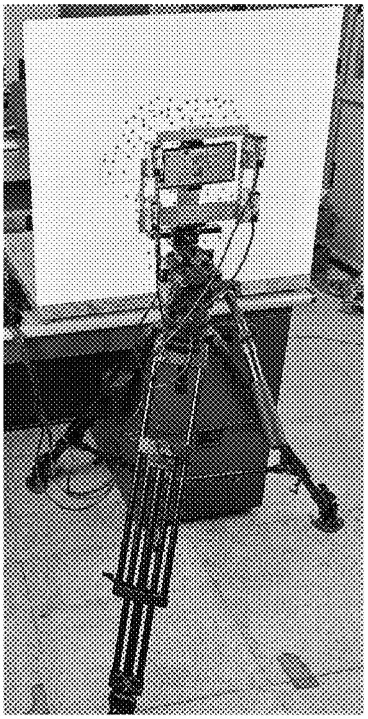
FIG. 21*e* is a first photographic view showing an SDMA configured to hold a mobile phone in a horizontal (landscape) orientation.
Figure 21F:
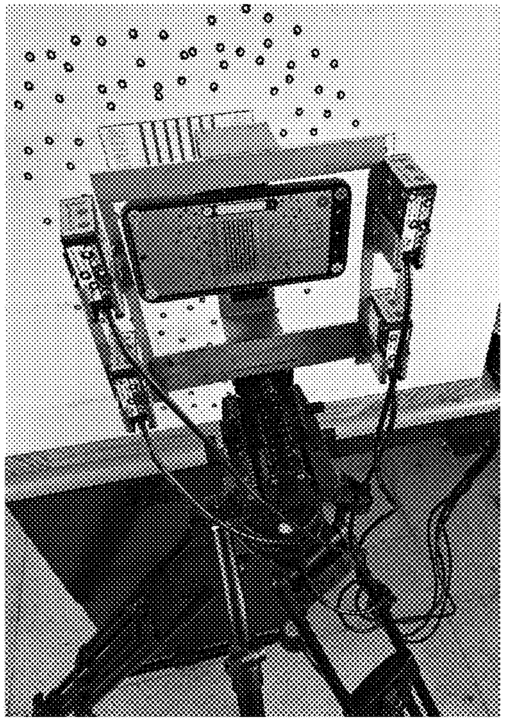
FIG. 21*f* is a second photographic view showing an SDMA configured to hold a mobile phone in a horizontal (landscape) orientation.

The experimental results of these standard crack-width measurement tests using the preliminary app are illustrated in FIGS. 20*a* to 20*d*. In these figures, the "true" crack-width values W True corresponding to the app-measured values $w_{App}$ were obtained through systematic repeated manual measurements using the five crack-width measuring magnifiers, as previously described and illustrated in FIGS. 4*e*-4*g*. FIGS. 20*a* and 20*b* present the results of 10 standard tests with a target $K_i$ of 15 cm, while FIGS. 20*c* and 20*d* show the results of 5 standard tests with a target $K_i$ of 20 cm.

A measured value $w_{App}$ can be divided by the "physical size per unit pixel," calculated by the app using ARCore-AR routines, to determine the corresponding pixel count. If the pixel count is too low, the error in converting the crack width to an integer number of pixels could be significant. Therefore, the experimental results in FIGS. 20*a* to 20*d* only include $w_{App}$ measurements with a pixel count of 4 or more, discarding those with fewer than 4 pixels. This also helps determine the app's minimum measurable crack width, which corresponds to a $w_{App}$ value with a pixel count of 4. The main difference between FIGS. 20*a*-20*b* and FIGS. 20*c*-20*d* is the minimum measurable crack width. In the former, the minimum $w_{App}$ is 0.33 mm due to the shorter target distance $K_i$ of 15 cm between the phone and the SW. In the latter, the minimum $w_{App}$ is 0.50 mm because of the longer target $K_i$ of 20 cm.

Brief Discussion of the Experimental Results

The smallest target $K_i$ is approximately 15 cm, as the phone's camera can hardly capture clear images for target $K_i$ values smaller than this. Consequently, the experimental results (FIGS. 20*a* and 20*b*) also indicate the app's minimum measurable crack width as 0.33 mm, which is too large for most engineering applications. This limitation can be attributed to the relatively low resolution of the captured images. The preliminary app executes its preview function with the camera controlled by ARCore-AR, limiting image capture to the resolution of the phone's screen display, which is generally much lower than the camera's full resolution.

The experimental results (FIGS. 20*a* to 20*d*) could be further investigated from various perspectives, such as (1) the wide scattering of the Aw distribution in FIGS. 20*a* to 20*d*, and (2) the skewness toward negative values in the Aw distribution. The wide scattering of the Aw distribution is likely due to the precision level of the AR-detected physical distances (Step <4> in FIG. 17), which is meant to meet human vision requirements rather than the higher accuracy needed for engineering measurements. The negative skewness in the Aw distribution, approximately half a pixel in size, is likely related to the app's method for determining crack edges. More in-depth investigations could be pursued through highly repeated and systematic experiments using the invented standard test apparatus and method.

Results and Discussion: 1. Summary of Results

In this invention, a standard apparatus and method were developed to test and validate the accuracy of mobile phone apps in measuring concrete crack widths. The apparatus incorporates a standard CWCP 2 and SW 1, along with a specialized PAFD 3 and SDMA 4. In the test method, the innovative two-stage procedure associated with the SDMA 4 synchronously calculates and displays the four average distances K from the phone's corner points $P_i$ (i=1-4) to the SW 1. With continuous feedback, the phone's position can be adjusted using the PAFD 3 until the monitored $K_i$ values match the target Kj. Subsequently, the app installed on the phone is used to measure the crack widths on the CWCP 2. A standard experimental procedure was established to conduct standard tests assessing the accuracy of the preliminary Android app in measuring concrete crack widths.

Results and Discussion: 2. Cost Effectiveness of the Two-Stage Method

The specialized SDMA 4 consists of a custom-designed stainless-steel holder, four LDSs 6, and the mobile phone 5 used for testing. The outcome of 3D scanning in Stage 1 of the procedure-3D coordinates of the eight spatial points ($P_1$-$P_4$ and $S_1$-$S_4$) and the four 3D unit vectors ($\hat{u}_1$-$\hat{u}_4$)—represents the spatial relationships between the phone and the four LDS laser beams in the SDMA 4. In Stage 2, these 3D coordinates are used with the LDS real-time distance measurements ($d_1$-$d_4$) to synchronously calculate and display the four $K_i$ values.

An alternative strategy for determining the spatial relationship between the phone 5 and the four LDSs 6 is to predefine a specific spatial arrangement and then manufacture a holder that conforms precisely to this arrangement to secure the four LDSs 6. However, this strategy requires high-precision machinery to fabricate such a metal holder, which may be cost-prohibitive. Therefore, the Stage 1 method is employed: the stainless-steel holder 41 is fabricated using conventional sheet metal processing to secure the four LDSs 6, and the spatial relationship between the phone and the four LDS laser beams is then determined using widely available 3D scanning technology. This approach should be significantly more cost-effective.

In addition, the stainless-steel holder 41 and SDMA 4 described thus far in this document hold the mobile phone 5 in a vertical (portrait) orientation. As shown in FIGS. 21*a* to 21*f*, a cost-effective stainless-steel holder and SDMA can also be easily fabricated to hold the phone in a horizontal (landscape) orientation to investigate the effects of phone orientation.

Results and Discussion: 3. Adequacy of the Allowable Limits

In Step (m) of the standard experimental procedure (FIG. 16), the permissible criteria for the measurement differences $\Delta d_i$ and ΔK; are set to ±1.0 mm and ±0.8 mm, respectively. These represent the differences between the real-time monitored $d_i$ and $K_i$ values (obtained from the LDS/data logger measurement) and their corresponding 3D scanning/point-cloud measurement values. As 3D scanning/point-cloud measurements inherently include minute random errors, a subtle question may arise regarding the adequacy of the allowable limits (±1.0 mm and ±0.8 mm), which are based on the inexact 3D scanning measurements. However, considering the underlying physical meaning of the test method as described earlier in this document, these limits (±1.0 mm and ±0.8 mm) [approximately equivalent to ±0.63% (±1.0 mm/160 mm) and ±0.53% (±0.8 mm/150 mm), respectively] should be precise enough for the standard tests to realistically mimic actual engineering conditions, where the app user is engaging with a perceived crack plane rather than a true mathematical plane.

Results and Discussion: 4. Extensibility for Inclined-Phone Conditions

The standard tests conducted on the preliminary app, along with the experimental procedure (FIGS. 16-19) and results (FIG. 20*a*-20*d*) presented in this document, all had the four monitored $K_1 \cong K_2 \cong K_3 \cong K_4$ matching the target $K_i$. In other words, the standard test method described here addresses the scenario where the mobile phone's screen is parallel to the test wall (SW) 1. However, the standard test method can be extended to accommodate conditions where the phone's screen is inclined relative to the wall. This can be achieved by setting varied $K_1$-$K_4$ values to produce a predefined inclination angle.

Results and Discussion: 5. Merits and Primary Functions of the Standard Test Method In summary, the standard test apparatus and method have two primary functions: (1) controlling the required experimental parameters of the test conditions, and (2) reproducing the required test conditions for repeated experiments. These two functions (a) enable the investigation of the effects of various experimental parameters, (b) allow for the comparison of experimental results under identical test conditions, and (c) facilitate repeated, systematic experiments to establish the reliability of the app's accuracy validation.

A crack-width measuring app still requires real-world validation on actual concrete cracks. However, drawing a comparison to global efforts in vaccine and drug development, the standard crack-width measurement test is analogous to easily repeatable "animal trials," whereas validation using real concrete cracks is akin to "human trials." Just as human trials are difficult to conduct frequently and systematically, real-world concrete crack measurements present similar challenges. Therefore, standard measurement tests, which are easy to repeat frequently, are indispensable, much like animal trials in drug development.

Results and Discussion: 6. Future Possibilities

In addition to testing and verifying the accuracy of apps in measuring crack widths, the standard test method may also serve to standardize concrete crack-width measurements and provide, for the first time, an objective and unified definition for concrete-surface crack widths. Traditional methods for measuring concrete crack widths, such as crack measuring magnifiers or crack-width comparator cards, rely on subjective visual readings with the naked eye. As a result, the determination and use of concrete crack widths have been somewhat self-evident, and to the inventors' knowledge, there is no precise objective definition of concrete crack widths to date. The ability of apps to perform objective crack-width measurements, combined with a standard test method for validating their accuracy, could help resolve this issue in the future.

Interpretation of Terms and Scope of the Invention:

Words such as "one", "an/a", "the", "said" and "at least one" are used herein to indicate the presence of one or more elements/component parts/and others. Terms such as "including" and "having" are inclusive, meaning that additional elements/component parts/and others may be present in addition to those listed. The terms "first" and "second" are used herein merely as markers and do not limit the number of objects to which they refer.

While the invention has been described by way of example and in terms of the preferred embodiments, it should be understood that the invention is not limited to the disclosed embodiments. On the contrary, it is intended to cover various modifications and similar arrangements, as would be apparent to those skilled in the art. Therefore, the scope of the appended claims should be accorded the broadest interpretation so as to encompass all such modifications and similar arrangements.

We claim:

1. A standard test method for validating the accuracy of mobile phone apps in measuring concrete crack widths, the standard experimental procedure comprising the steps of:

(a) setting the desired target distances ($K_1$-$K_4$) from the four corner points ($P_1$-$P_4$) of the mobile phone to a simulated wall (SW);

(b) connecting four laser displacement sensors (LDSs) to a data logger and computer, and performing zeroing operation for the LDSs using a zero-calibration caliper (ZCC);

(c) attaching the mobile phone and the four LDSs onto a metal holder to assemble the spatial distance measuring assemblage (SDMA), and then mounting the SDMA on top of a pose adjusting and fixing device (PAFD) to complete the Stage 1 setup with an arbitrary wall panel;

(d) using a 3D scanner to scan the Stage 1 setup with the wall panel to generate a 3D point cloud of the setup and wall;

(e) selecting 12 spatial points from the 3D point cloud of Step (d), including the laser-emitting points of the four LDSs ($S_1$-$S_4$), the laser-terminal points on the wall panel ($E_1$-$E_4$), and the four corner points $P_1$-$P_4$ of the mobile phone, then exporting the 3D coordinates of these 12 spatial points;

(f) from the 3D coordinates of the 12 spatial points of Step (e), calculating the four 3D unit vectors ($\hat{u}_1$-$\hat{u}_4$) pointing from $S_1$-$S_4$ towards $E_1$-$E_4$, and generating the parameter-setting code for the real-time calculation program of the data logger;

(g) repositioning the SDMA and PAFD to face a test wall, completing the Stage 2 setup for a validation experiment, while ensuring the relative spatial positions of the mobile phone and the four LDSs within the SDMA remain unchanged;

(h) importing the parameter-setting code (for $P_1$-$P_4$, $S_1$-$S_4$, and $\hat{u}_1$-$\hat{u}_4$) generated in Step (f) into the data logger's calculation program, and activating the continuous automatic measurement and display of $d_1$-$d_4$ (denoted as $$d_i^{LDS})$$

and $K_1$-$K_4$ (denoted as $$K_i^{LDS});$$

(i) adjusting the SDMA's position using the PAFD until the monitored $K_1$-$K_4$ values displayed by the data logger and computer closely match the desired target distances of Step (a);

(j) using the 3D scanner to scan the entire Stage 2 setup and wall for this validation experiment, generating the 3D point cloud for the setup and wall;

(k) selecting 12 spatial points from the 3D point cloud of Step (j), including the four corner points $P_1$-$P_4$ of the mobile phone, the laser-emitting points $S_1$-$S_4$ of the four LDSs, and the laser-terminal points on the wall ($W_1$-$W_4$), and exporting the 3D coordinates of these points;

(l) calculating the distances $d_1$-$d_4$ (denoted as $$d_i^{3D})$$

and $K_1$-$K_4$ (denoted as $$K_i^{3D})$$

from the 3D coordinates of the 12 points exported in Step (k);

(m) comparing the LDS/data logger measurements $$(d_i^{LDS} \text{ and } K_i^{LDS})$$

with the 3D scanning measurements $$(d_i^{3D} \text{ and } K_i^{3D}),$$

and determining whether the differences $\Delta d_i$ and $\Delta K_i$ are within ±1.0 mm and ±0.8 mm, respectively, and if so, proceeding to Step (n), otherwise returning to Step (b) and repeating Steps (b)-(l);

(n) repositioning the SDMA and PAFD to face the SW and a crack-width calibration plate (CWCP) embedded in the SW, completing the Stage 2 setup for the standard crack-width measurement test, while ensuring the relative spatial positions of the mobile phone and the four LDSs within the SDMA remain unchanged; and (o) conducting the standard crack-width measurement test by using the app on the mobile phone in the SDMA to measure the widths of the cracks on the CWCP.

2. The standard test method of claim 1, wherein the detailed operating procedure for Steps (n) and (o) further comprising the steps of:

<1> repositioning the SDMA and PAFD assembly to face the SW and the CWCP, after passing the validation experiment (Step (m) of claim 1), while ensuring the relative spatial positions of the mobile phone and the four LDSs within the SDMA remain unchanged;

<2> temporarily removing the CWCP from the SW to measure the illuminance at the surface of the CWCP using a lux meter, adjusting the lighting conditions so that the lux meter indicate an illuminance of 750-1000 lux or other desired values, re-embedding the CWCP into the SW, starting the app on the mobile phone, and activating its preview function;

<3> adjusting the SDMA by using the PAFD until both of the following conditions are satisfied: (1) the measured $K_1$-$K_4$ values displayed by the operating software of the data logger closely match the target $K_i$ values; and (2) in the app's preview on the phone's screen, the vertical center line aligns with the edge of the center vertical black stripe of the CWCP, and the horizontal center line aligns with the center of a desired crack on the CWCP;

<4> optionally, if the app uses AR detection: temporarily taking the SDMA apart from the PAFD, moving the SDMA to detect the crack-measurement surface (the SW and the CWCP) using the app's AR-detection function until an AR plane has been detected on the phone's screen, and reinstalling the SDMA onto the PAFD while maintaining the AR plane detected on the phone's screen;

<5> if Step <4> is performed, repeating Step <3> to re-satisfy both conditions: (1) the measured $K_1$-$K_4$ values displayed by the operating software of the data logger closely match the target $K_i$ values; and (2) in the app's preview on the phone's screen, the vertical center line aligns with the edge of the center vertical black stripe of the CWCP, and the horizontal center line aligns with the center of a desired crack on the CWCP; if Step <4> is excluded, consolidating Steps <3> and <5> into a single step to ensure both conditions are satisfied;

<6> capturing the desired crack image by clicking the camera-shutter button on the app's preview screen, after which the app's screen immediately transitions to the crack-measuring function;

<7> measuring a desired crack width from the captured image by manipulating the user interface of the app's crack-measuring function;

<8> repeating the actions of Step <7> until all the desired crack widths of the captured crack image have been measured; and <9> repeating Steps <3> to <8> to capture and measure crack widths of additional crack images, including capturing another crack image (Steps <3> to <6>) and measuring all desired crack widths in this image by repeating Steps <7> to <8>.

3. The standard test method of claim 1, wherein the SW comprises a wooden material, and the CWCP is fabricated from a metal material.

4. The standard test method of claim 1, wherein the SW comprises a tilt adjustment mechanism configured to control its vertical tilt, the tilt adjustment mechanism optionally including a base and a brace rod.

5. The standard test method of claim 1, wherein the SW comprises:

a square opening configured to house the CWCP, the CWCP being removably embedded within the square opening; and a slot opening adjacent to the square opening, the slot configured to provide a dedicated space for a lux meter to measure the illuminance at the surface of the CWCP prior to conducting a crack-width measurement test.

6. The standard test method of claim 1, wherein the CWCP comprises multiple simulated cracks, each having a distinct crack width, and optionally includes multiple stripes oriented perpendicular to the simulated cracks, configured to mark potential width-measurement points along the simulated cracks.

7. The standard test method of claim 1, wherein the CWCP comprises simulated cracks, and the crack widths at the designated positions on each simulated crack, corresponding to positions used by the mobile app for crack-width measurements, are systematically measured by at least three individuals, each performing a minimum of two rounds of measurements.

8. The standard test method of claim 1, wherein the PAFD optionally comprises a tripod and a tripod head, further paired with an accessory configured to be attached on top of the tripod head, the accessory being capable of providing perpendicular bidirectional translational adjustments.

9. The standard test method of claim 1, wherein the SDMA comprises a metal holder, four LDSs and a mobile phone used for testing, wherein:

the mobile phone is securely held at the center of the metal holder using a smartphone grip; and the four LDSs are fastened to the metal holder using u-shaped sockets positioned near its corners.

10. The standard test method of claim 1, wherein the ZCC comprises:

a base plate having a U-shaped groove configured to accommodate four LDSs;

a fixed reference surface on one side of the U-shaped groove, the reference surface providing a fixed distance for the clamped LDSs;

a movable metal plate on the opposite side of the U-shaped groove, the movable metal plate being laterally adjustable to securely clamp the LDSs in place; and a calibration mechanism configured to enable the zeroing operation of the LDSs, wherein:

prior to placement on the SDMA's metal holder for a standard test, the four LDSs are clamped in place within the ZCC;

while the LDSs remain clamped, the data logger is operated to zero the displacement readings such that the initial readings for all four LDS channels are set near zero;

after executing the zeroing operation, each LDS reading is incremented synchronously by the fixed distance, wherein the fixed distance represents the absolute distance from the laser-emitting points of the LDSs to their terminal points on the ZCC; and after the zeroing operation, the four LDSs are detached from the ZCC and reattached to the SDMA's metal holder for subsequent test measurements, wherein real-time measurements displayed by the data logger reflect the absolute distances $$d_i^{LDS}$$

between the laser-emitting points and their respective terminal points on the test wall.

* * * * *